United States Patent
Runyon et al.

(10) Patent No.: US 9,571,183 B2
(45) Date of Patent: Feb. 14, 2017

(54) SYSTEMS AND METHODS FOR POLARIZATION CONTROL

(71) Applicant: ViaSat, Inc., Carlsbad, CA (US)

(72) Inventors: Donald L. Runyon, Johns Creek, GA (US); Sharad V. Parekh, Frisco, TX (US)

(73) Assignee: ViaSat, Inc., Carlsbad, CA (US)

(*) Notice: Subject to any disclaimer, the term of this patent is extended or adjusted under 35 U.S.C. 154(b) by 0 days.

(21) Appl. No.: 14/754,904

(22) Filed: Jun. 30, 2015

(65) Prior Publication Data

US 2015/0381265 A1    Dec. 31, 2015

Related U.S. Application Data

(60) Provisional application No. 62/019,383, filed on Jun. 30, 2014.

(51) Int. Cl.
*H04B 7/185* (2006.01)
*H01Q 1/42* (2006.01)
(Continued)

(52) U.S. Cl.
CPC ........ *H04B 7/18513* (2013.01); *H01Q 1/1264* (2013.01); *H01Q 1/288* (2013.01);
(Continued)

(58) Field of Classification Search
CPC ... H01P 1/173; H01Q 13/0258; H01Q 1/1264; H01Q 1/288; H01Q 1/421; H01Q 21/245; H04B 7/18513
(Continued)

(56) References Cited

U.S. PATENT DOCUMENTS 3,943,517 A * 3/1976 Vogt ...................... H01Q 21/245
                                                    342/362
3,956,699 A * 5/1976 Leahy .................. H04B 14/008
                                                    342/365
(Continued)

FOREIGN PATENT DOCUMENTS

EP    0437190 A2 *  7/1991  ........... H01Q 15/242
EP    0437190 A2    7/1999
(Continued)

OTHER PUBLICATIONS

Vaccaro, et al., Ku-Band Low Profile Antennas for Mobile Satcom; IEEE—Mar. 2008; 5 pages, Switzerland.
(Continued)

*Primary Examiner* — Tan H Trinh
(74) *Attorney, Agent, or Firm* — Holland & Hart LLP

(57) ABSTRACT

The described technology uses a dual circularly polarized panel antenna and equal amplitude variable phase control between the two circularly polarized components to achieve a rotatable linear polarization tracking system. An example antenna system includes a plurality of antenna elements that include a plurality of polarization transducers to generate a first signal component and a second signal component from a received wave. A polarization control network applies a phase difference based on an orientation of the linear polarization of the wave with respect to the antenna system between the signal components to generate adjusted signal components. The polarization control network combines the adjusted signal components to form a composite signal that corresponds to the linear polarization of the wave. Linearly polarized transmit and receive signals may be co-polarized or cross-polarized.

36 Claims, 18 Drawing Sheets

(51) Int. Cl.
   *H01Q 1/12* (2006.01)
   *H01Q 1/28* (2006.01)
   *H01Q 21/24* (2006.01)
   *H01P 1/17* (2006.01)
   *H01Q 13/02* (2006.01)

(52) U.S. Cl.
   CPC .......... H01Q 1/421 (2013.01); H01Q 21/245 (2013.01); *H01P 1/173* (2013.01); *H01Q 13/0258* (2013.01)

(58) Field of Classification Search
   USPC .............. 455/13.3, 63.4, 67.11, 67.16, 575.7, 455/575.9, 99, 121, 397, 334, 341, 328, 329, 455/311, 309, 304, 344, 345, 80, 81; 343/776, 343/772, 368, 761, 757, 369; 342/362, 361
   See application file for complete search history.

(56) References Cited

U.S. PATENT DOCUMENTS

| | | | | |
|---|---|---|---|---|
| 4,353,041 A * | 10/1982 | Bryans | ................ | H01P 1/172 333/21 A |
| 5,185,608 A * | 2/1993 | Pozgay | ................ | G01S 7/024 342/17 |
| 5,304,999 A * | 4/1994 | Roberts | ............... | H01Q 21/245 333/117 |
| 6,300,900 B1 * | 10/2001 | Bleret | ................. | H01Q 21/245 342/361 |
| 6,380,896 B1 * | 4/2002 | Berger | ............... | H01Q 9/0435 343/700 MS |
| 6,388,537 B1 * | 5/2002 | Matsumoto | ........... | H01P 1/2131 333/125 |
| 6,473,053 B1 * | 10/2002 | Krishmar-Junker | ..... | H01Q 5/55 343/756 |
| 6,507,323 B1 * | 1/2003 | West | ................. | H01P 1/161 343/772 |
| 6,946,990 B2 | 9/2005 | Monk | | |
| 6,950,073 B2 | 9/2005 | Clymer et al. | | |
| 7,969,357 B2 | 6/2011 | Russo et al. | | |
| 8,077,103 B1 * | 12/2011 | Acosta | .................. | H01Q 1/288 333/21 A |
| 8,390,518 B2 * | 3/2013 | Haustein | ............... | H01Q 21/24 343/700 MS |
| 8,525,616 B1 * | 9/2013 | Shaw | ................... | H01P 1/173 333/126 |
| 8,634,760 B2 | 1/2014 | Chang et al. | | |
| 8,995,943 B2 * | 3/2015 | Corman | .................. | H04B 7/10 342/352 |
| 9,020,069 B2 * | 4/2015 | Saunders | .............. | H04L 27/362 375/298 |
| 9,094,102 B2 * | 7/2015 | Corman | ................... | H01Q 3/26 |
| 9,099,787 B2 * | 8/2015 | Blech | ..................... | H01Q 13/06 |
| 2004/0104843 A1 * | 6/2004 | Mimura | ............ | G01R 29/0892 342/362 |
| 2004/0140864 A1 * | 7/2004 | Chen | .................... | H01P 1/2131 333/126 |
| 2006/0097940 A1 * | 5/2006 | Shimawaki | ............. | H01Q 3/26 343/761 |
| 2007/0055402 A1 * | 3/2007 | Guez | ................... | G05B 13/042 700/104 |
| 2009/0021436 A1 | 1/2009 | Clymer et al. | | |
| 2009/0073064 A1 | 3/2009 | Russo et al. | | |
| 2010/0123636 A1 * | 5/2010 | Bezuidenhout | ........ | H01P 1/161 343/756 |
| 2010/0188304 A1 | 7/2010 | Clymer et al. | | |
| 2010/0207829 A1 * | 8/2010 | Parsche | ................. | H01Q 13/10 343/732 |
| 2011/0006948 A1 | 1/2011 | Larregle et al. | | |
| 2011/0215976 A1 | 9/2011 | Clymer et al. | | |
| 2011/0267250 A1 | 11/2011 | Seifried et al. | | |
| 2013/0115886 A1 * | 5/2013 | Khan | ....................... | H01Q 3/26 455/42 |
| 2013/0141300 A1 * | 6/2013 | Runyon | .................. | H01P 5/12 343/786 |
| 2013/0157601 A1 * | 6/2013 | O'Keeffee | ............ | H01Q 3/267 455/226.1 |
| 2013/0279631 A1 * | 10/2013 | Bowers | .................. | H04L 27/04 375/300 |
| 2015/0108210 A1 * | 4/2015 | Zhou | ....................... | H03H 7/18 235/375 |
| 2015/0194720 A1 * | 7/2015 | Tantawi | .................. | H01P 5/082 333/125 |

FOREIGN PATENT DOCUMENTS

| | | | | |
|---|---|---|---|---|
| EP | 1501156 A1 * | 1/2005 | ............ | H01Q 1/281 |
| EP | 1501156 A1 | 1/2005 | | |
| EP | 1693922 A1 | 8/2006 | | |
| WO | WO2016004001 A1 | 1/2016 | | |

OTHER PUBLICATIONS

ISA/EPO—International Search Report and Written Opinion for International Appl. No. PCT/US2015/038481, 14 pgs.
Schrank, H.: *"Antenna Designer's Handbook"*, IEEE Antennas and Propagation Society Newsletter, IEEE, Piscataway, NJ, USA, vol. 25, No. 5, Oct. 1, 1983, pp. 23-24 XP011330215.

* cited by examiner

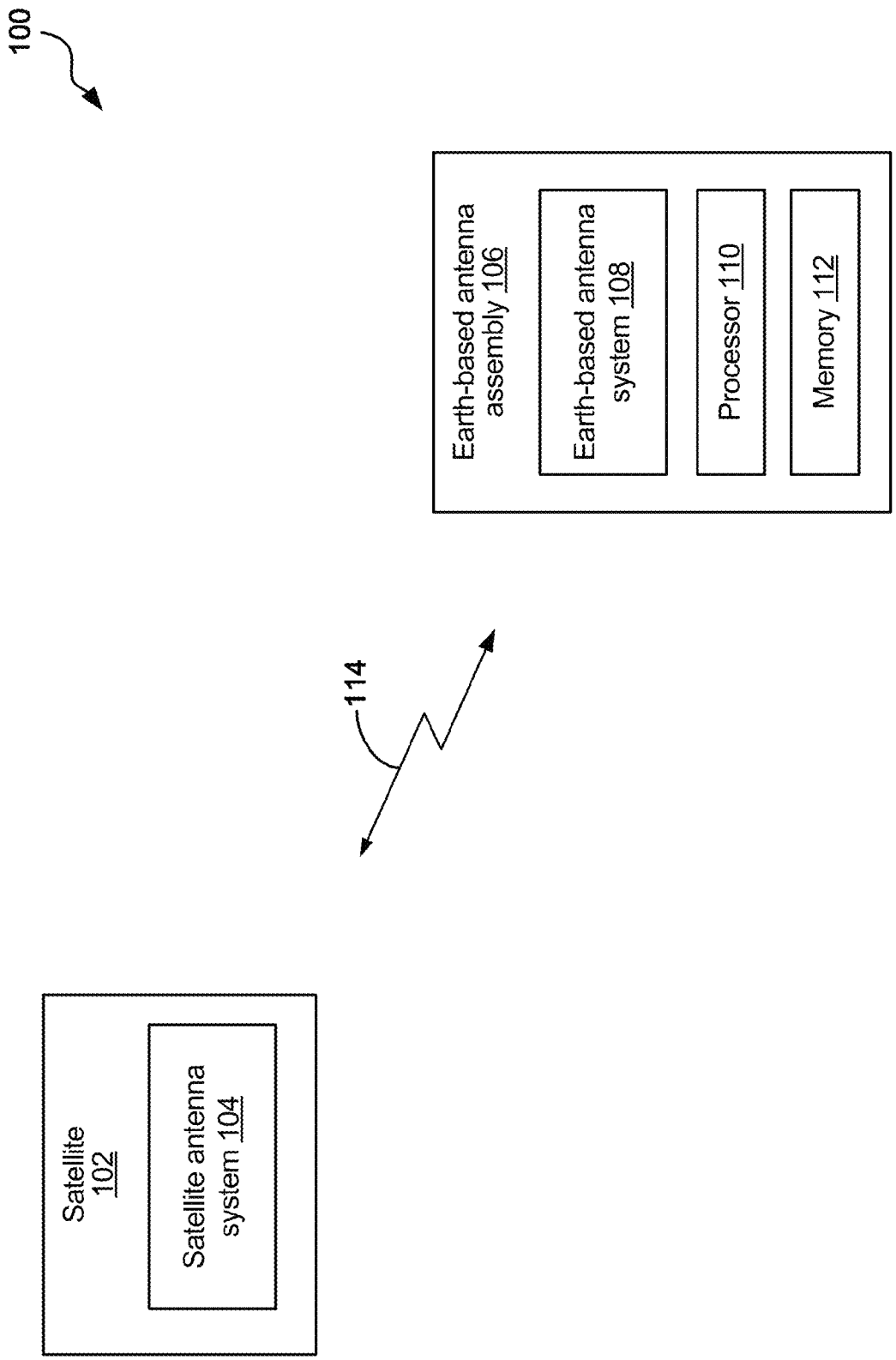

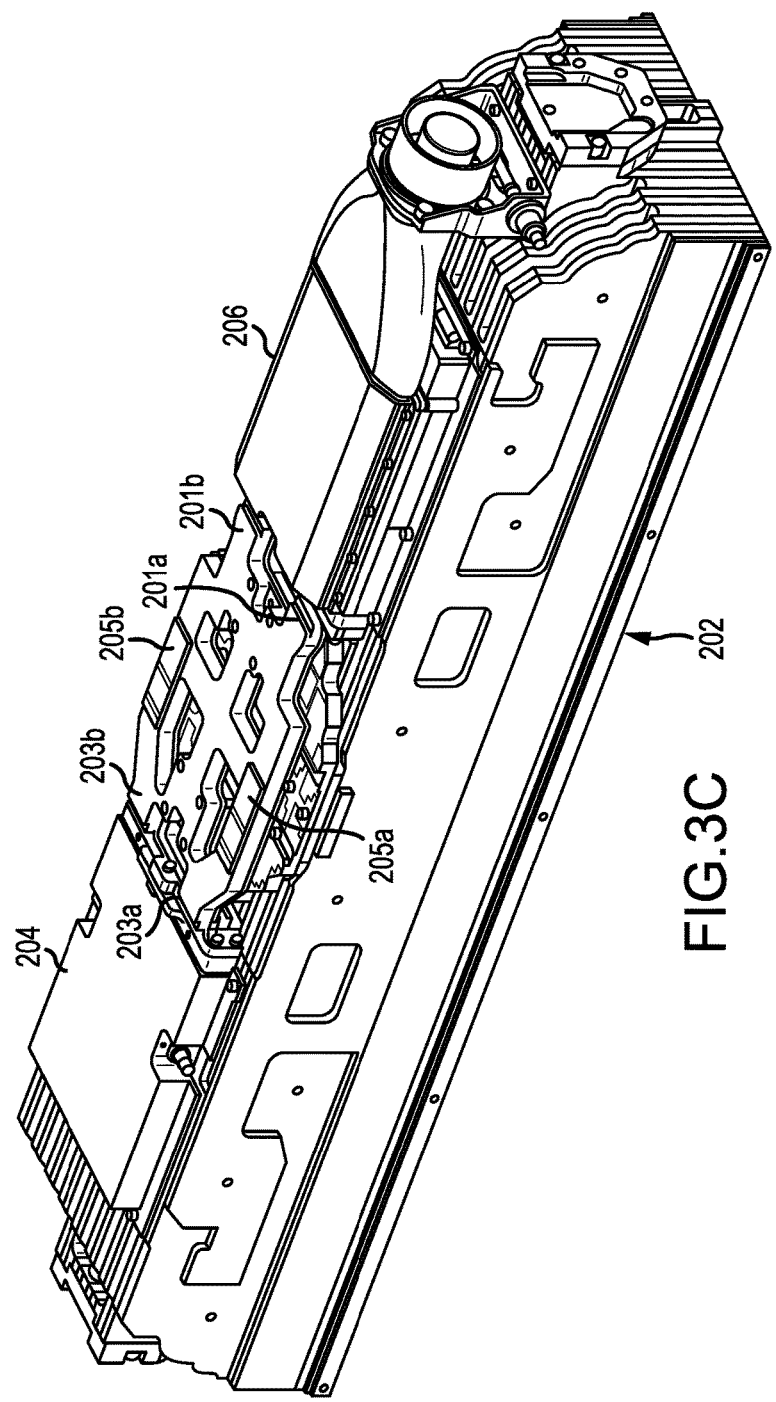

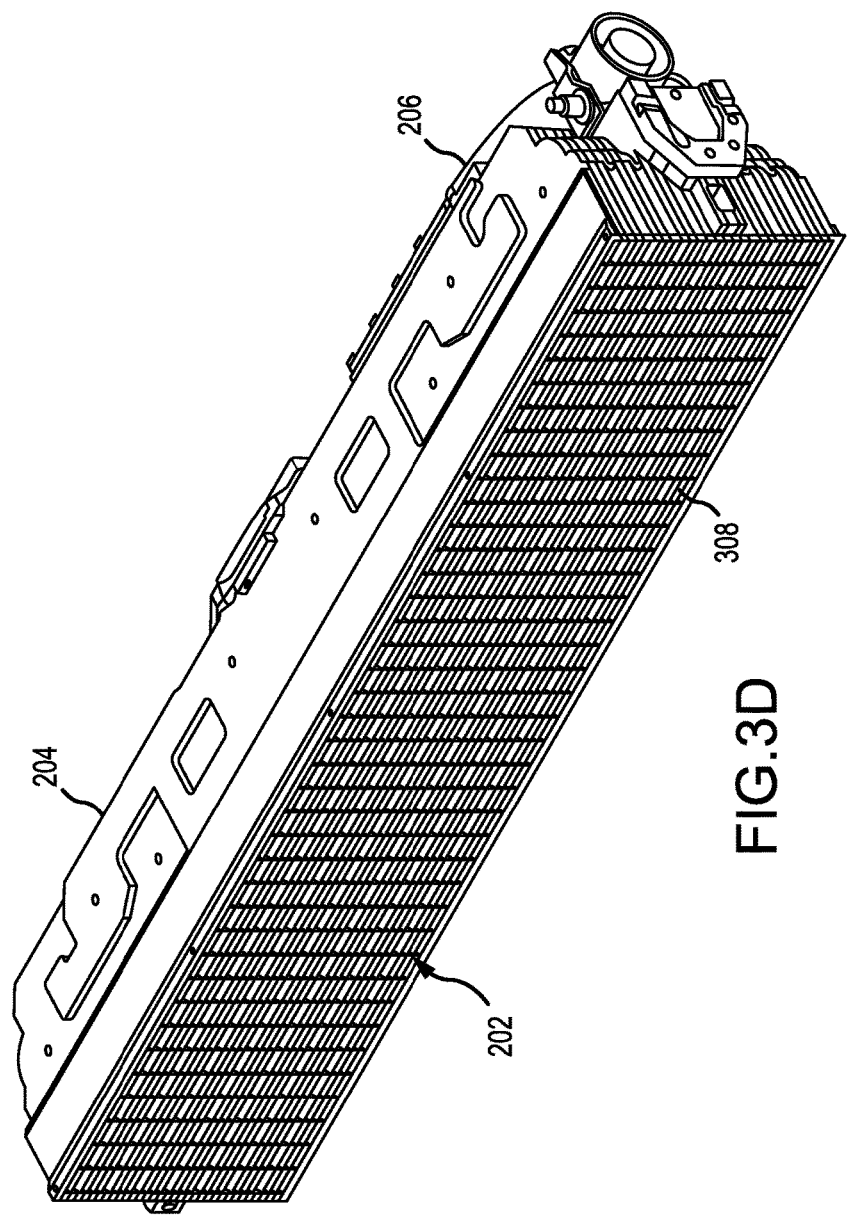

SYSTEMS AND METHODS FOR POLARIZATION CONTROL

CROSS-REFERENCES

The present application claims the benefit of U.S. Provisional Patent Application Ser. No. 62/019,383 filed on Jun. 30, 2014, entitled "SYSTEMS AND METHODS FOR POLARIZATION CONTROL," which is incorporated herein by reference in its entirety.

BACKGROUND

Field

The described technology generally relates to antenna systems and methods for controlling wave polarization, specifically to controlling linear polarization with multiple polarization components.

Description of the Related Art

Ku-band antennas operating with linearly polarized (LP) satellite waves often utilize continuous polarization alignment to maximize sending and receiving the desired LP wave while minimizing the interference from an orthogonal LP wave. Satellite communications for fixed satellite services (FSS) and for vehicular mobile earth stations (VMES) typically use dual-linear orthogonal polarizations on the user link for two-way communications. In typical systems, the linear polarizations include vertical and horizontal polarizations, and the satellite antenna is oriented in the satellite coordinate system in a way that the vertical polarization is aligned true north-south as seen by an earth station located at a sub-satellite point on Earth. The horizontal polarization is aligned in a true east-west orientation at the sub-satellite point. Earth stations receiving these waves also typically utilize linearly polarized antennas having a fixed orientation in a local coordinate system defined by the earth station (mobile or fixed). The orientation of the two orthogonal linear polarizations of the satellite transmission will rotate in the local earth station coordinate system as the earth station moves and changes orientation with respect to true north-south of the Earth. It is therefore necessary to perform polarization tracking as a mobile earth station moves to dynamically match the rotation of the polarization of the satellite signals as seen by the earth station.

It is often the practice in the case of circular reflector antennas to mechanically rotate the entire antenna assembly to match the rotation of the fixed satellite polarizations. Alternatively, the feed subassembly including the polarization mode launch subassembly may be rotated.

In the case of panel type mobile earth station antennas that have a significant aspect ratio (e.g., width/height greater than 3:1), a combining technique may be used. For example, a Ku-band panel type mobile earth station with dual linearly polarized antennas can use a mechanical actuated or electronic control component to combine the two linearly polarized components to produce a rotated set of linearly polarized components to match the satellite polarization. This can be accomplished by a pair of orthomode transducers (OMTs) arranged with a common port axis and mechanically rotating one while holding the other stationary, or by a variable power combiner or divider (VPC or VPD) radio frequency (RF) circuit. The VPC or VPD may use phase shifting and passive 4-port hybrid type circuits to achieve a variable amplitude control.

SUMMARY

Systems and methods of the described technology may each have several aspects, no single one of which may be solely responsible for its desirable attributes.

In one embodiment, an antenna system comprises a plurality of antenna elements to receive a wave having a linear polarization. The plurality of antenna elements includes a plurality of polarization transducers to generate a first signal component and a second signal component from the received wave, where the first and second signal components have equal amplitude independent of orientation of the linear polarization of the wave relative to the antenna system. A polarization control network applies a phase difference between the first signal component and the second signal component to generate an adjusted first signal component and an adjusted second signal component, wherein the applied phase difference is based on the orientation of the linear polarization of the wave relative to the antenna system. The polarization control network also combines the adjusted first and second signal components to form a composite signal that corresponds to the linear polarization of the wave.

In another embodiment, an antenna system comprises a polarization control network to obtain a transmit signal that corresponds to a linear polarization of a wave to be transmitted by the antenna system. The polarization control network forms a first signal component and a second signal component from the transmit signal. The first signal component and the second signal component have equal amplitude independent of orientation of the linear polarization of the wave relative to the antenna system. The polarization control network also applies a phase difference between the first signal component and the second signal component to generate an adjusted first signal component and an adjusted second signal component, wherein the applied phase difference is based on the orientation of the linear polarization of the wave relative to the antenna system. A plurality of antenna elements receive the adjusted first signal component and the adjusted second signal component and include a plurality of polarization transducers to generate the wave having the linear polarization from the adjusted first signal component and the adjusted second signal component.

In another embodiment, a method comprises receiving, at a plurality of antenna elements including a plurality of polarization transducers, a wave having a linear polarization. The wave is converted by the plurality of polarization transducers to generate a first signal component and a second signal component, the first and second signal components having equal amplitude independent of orientation of the linear polarization of the wave relative to the plurality of antenna elements. A phase difference is applied, by a polarization control network, between the first signal component and the second signal component to generate an adjusted first signal component and an adjusted second signal component. The applied phase difference is based on the orientation of the linear polarization of the wave relative to the plurality of antenna elements. The polarization control network also combines the adjusted first and second signal components to form a composite signal that corresponds to the linear polarization of the wave.

In another embodiment, a method comprises obtaining, at a polarization control network of an antenna system, a transmit signal that corresponds to a linear polarization of a wave to be transmitted by the antenna system. The polarization control network forms a first signal component and a second signal component from the transmit signal. The first signal component and the second signal component have equal amplitude independent of orientation of the linear polarization of the wave relative to a plurality of antenna elements. A phase difference between the first signal component and the second signal component is applied by the polarization control network to generate an adjusted first signal component and an adjusted second signal component, wherein the applied phase difference is based on the orientation of the linear polarization of the wave relative to the plurality of antenna elements. The adjusted first and second signal components are received by the plurality of the antenna elements including a plurality of polarization transducers. The plurality of polarization transducers convert the adjusted first and second signal components to generate the wave having the linear polarization.

BRIEF DESCRIPTION OF THE DRAWINGS

These drawings and the associated description herein are provided to illustrate embodiments of the disclosed technology and are not intended to be limiting.

FIG. 1A is a functional block diagram of an example antenna communications system.

FIG. 3C is an example array of polarization transducers, array combiner, diplexers, receive, and transmit electronics in a unit.

FIG. 3D is a front view of the unit of FIG. 3C.

DETAILED DESCRIPTION

Figure 1B:
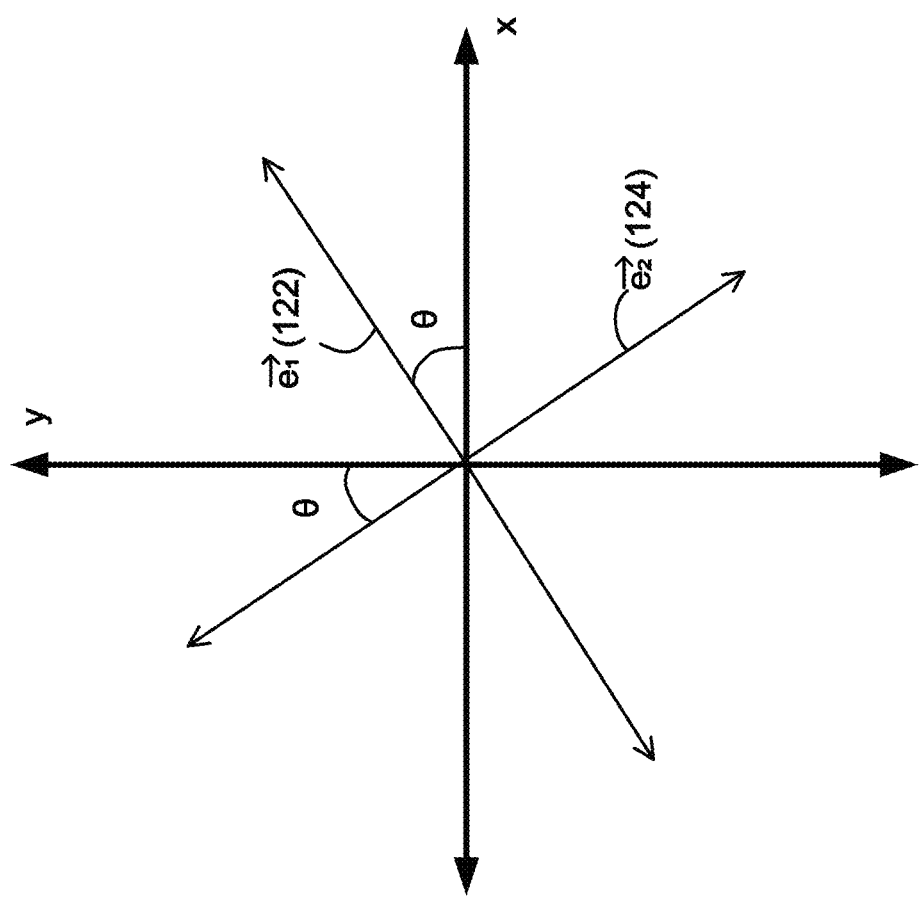
FIG. 1B is a diagram showing received or transmitted electric fields of a wave at an earth based antenna.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to cover such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In one innovative aspect, the described technology uses a dual circularly polarized panel antenna and uses equal amplitude variable phase control between two signal components corresponding to each sense of circular polarization to achieve a rotatable linear polarization tracking system. In one implementation, an array of radiating elements, where each element contains a dual-band septum polarizer is used as part of the implementation of this equal amplitude variable phase control. In receive, the signal component corresponding to right-hand circularly polarized (RHCP) radio frequency (RF) waves and the signal component corresponding to left-hand circularly polarized (LHCP) RF waves output from the dual-band septum polarizers can be combined in dual waveguide power divider/combiner networks. In transmit, the described technology allows two high power matched amplifiers to be connected to the transmit ports of the antenna through the waveguide power divider/combiner networks and may take advantage of the full power of both matched amplifiers to produce transmitted RF power. The RF power output of the different matched amplifiers may be applied to different input ports of the array of septum polarizers, and is output as a combined wave at the common port that is near the radiating apertures of the plurality of or array of elements. The waveguide power divider/combiner networks may be fixed beamforming networks (BFNs).

Diplexers can be used to separate transmit (Tx) and receive (Rx) signal components to configure a 4-port (Tx-RHCP, Tx-LHCP, Rx-RHCP, and Rx-LHCP) antenna. The transmit (Tx-RHCP and Tx-LHCP) signal components and the receive (Rx-RHCP and Rx-LHCP) signal components can be simultaneously and independently phase adjusted. Thus, linearly polarized transmit and receive waves may be co-polarized or cross-polarized.

Referring to FIG. 1A, a functional block diagram of an example antenna communications system is described. The exemplary antenna communications system 100 may include a satellite 102 and an Earth-based antenna assembly 106. The Earth-based antenna assembly 106 may be mobile (e.g. attached to a vehicle) or located in a fixed position. The satellite 102 may include a satellite antenna system 104, and the Earth-based antenna assembly 106 may include an Earth-based antenna system 108. One or more processors 110 and memory 112 are present in the Earth-based antenna system 108 for operation and control of the Earth-based antenna assembly 106. The satellite 102 may be any commercially or publically available satellite in an orbit around the Earth. The satellite antenna system 104 may be configured to transmit and receive waves 114 having one or more linear polarizations, typically defined by polarization basis axes of linear polarized (LP) antenna elements on the satellite 102. These polarizations can be electronically tracked (as opposed to mechanically tracked) by the Earth-based antenna assembly 106 using the technology described herein. The Earth-based antenna assembly 106 may be configured to provide satellite communications for fixed satellite services (FSS) or vehicular mobile earth stations (VMES). The Earth-based antenna assembly 106 may be mounted, for example, on an aircraft, such as an airplane, helicopter, and the like. Alternatively, the Earth-based antenna assembly 106 may be mounted, for example, on a ground based mobile platform. The Earth-based antenna system 108 may be configured to transmit and receive waves 114 having a linear polarization using an antenna aperture that is inherently responsive to circularly polarized waves. That is, the Earth-based antenna system 108 has a first output port that outputs a first signal that is maximized in response to receiving a first circularly polarized wave (e.g., a right-hand circularly polarized wave), and a second output port that outputs a second signal that is maximized in response to receiving a second circularly polarized wave (e.g., a left-hand circularly polarized wave). Further details of several suitable implementations of the Earth-based antenna system 108 will be discussed below. The specific implementations described herein relate to a Ku band antenna, but other communication frequency ranges, techniques, etc. can utilize the principles, methods, and systems described herein.

The Earth-based antenna assembly 106 may include a processor 110 and a memory 112. The processor 110 may be in communication with the Earth-based antenna system 108 as discussed further below. The memory 112 may be a non-transitory machine-readable storage medium such as a RAM, ROM, EEPROM, or the like. The memory 112 may be in communication with the processor 110, which may read from or write to the memory 112. Although the processor 110 and memory 112 are shown as individual separate elements from the antenna system 108, it will be appreciated that multiple processors and memory may be provided as part of the antenna system 108, external to the antenna system 108, or both.

As described above, the satellite antenna system 104 may transmit two orthogonal linearly polarized electromagnetic waves. Turning briefly to FIG. 1B, a diagram shows received or transmitted electric fields of a wave at an earth based antenna. A first linearly polarized wave, which is referred to herein as $\vec{e}_1$ 122 may be aligned along true east-west directly under the satellite 102. A second linearly polarized wave, which is referred to herein as $\vec{e}_2$ 124 may be aligned along true north-south directly under the satellite 102. As also shown in FIG. 1B, as the Earth-based antenna assembly 106 changes position and orientation, a tilt angle between $\vec{e}_1$ and $\vec{e}_2$ with respect to x and y axes fixed to the Earth-based antenna system 108 can change. In FIG. 1B, this tilt angle is denoted θ. The tilt angle θ is typically determined by knowledge of the position and orientation of the Earth-based antenna system 108 with respect to the true north-south-east-west compass directions using GPS receivers and magnetic field sensors associated with the antenna system 108, for example.

In embodiments in which the Earth-based antenna assembly 106 is mounted on an aircraft, the requisite information about platform orientation and heading information may be available on an ARINC 429 data bus. A self-contained Inertial Reference Unit (IRU) may be dedicated to the Earth-based antenna system 108 on the aircraft to provide the platform orientation and heading data. There may be installation offset values between the sensor package and the Earth-based antenna system 108. However, as mentioned above and described in further detail below, novel embodiments described herein do not need to perform any mechanical alignment, but instead may utilize a dual circularly polarized Earth-based antenna system 108 that receives $\vec{e}_1$ and $\vec{e}_2$ at whatever tilt angle θ exists due to the position and orientation of the Earth-based antenna assembly 106 relative to the satellite basis axes. Systems described herein utilize the fact that the received wave $\vec{e}_1 + \vec{e}_2$ can be represented as two circularly polarized waves, one with right-handed rotation (clockwise rotation as viewed by the receiver) and one with left-handed rotation (counter-clockwise rotation as viewed by the receiver) such that $\vec{e}_1 + \vec{e}_2 = \vec{e}_{RHCP} + \vec{e}_{LHCP}$, wherein $\vec{e}_{RHCP}$ is a right-hand circularly polarized wave and $\vec{e}_{LHCP}$ is a left-hand circularly polarized wave. Because $\vec{e}_1$ and $\vec{e}_2$ are linearly polarized and the Earth-based antenna system 108 is dual circularly polarized, a first output signal component of the antenna system 108 at a first port that is inherently responsive to right-hand $\vec{e}_{RHCP}$ and a second output signal component of the antenna system at a second port that is inherently responsive to left-hand $\vec{e}_{LHCP}$ will have the same magnitude. A relative phase of the output signal components will change depending on the tilt angle θ. As a result, and as described further below, the response of a dual circularly polarized Earth-based antenna system 108 to the $\vec{e}_1 + \vec{e}_2$ wave input is two output signal components that have equal amplitude independent of the tilt angle θ and different variable phase dependent on the tilt angle θ. As used herein, two "equal amplitude" signal components have substantially the same amplitude. The term "substantially" is intended to accommodate manufacturing process variations during the formation of the Earth-based antenna system 108 as well as other factors which may cause variations in the amplitudes of the signal components. The quantities $\vec{e}_1$, $\vec{e}_2$, $\vec{e}_{RHCP}$, and $\vec{e}_{LHCP}$ are vector quantities.

Initially, each of the two output signal components of the dual circularly polarized antenna system 108 corresponds to a mixture of $\vec{e}_1$ and $\vec{e}_2$. If the antenna output signal corresponding to $\vec{e}_{RHCP}$ is shifted by an appropriate amount with respect to the signal corresponding to $\vec{e}_{LHCP}$ and the antenna output signal corresponding to $\vec{e}_{LHCP}$ is recombined with the shifted antenna output signal corresponding to $\vec{e}_{RHCP}$, the resulting composite signal corresponds to the original linearly polarized wave component $\vec{e_1}$. Similarly, if the antenna output signal component corresponding to $\vec{e_{RHCP}}$ is shifted by a different appropriate amount with respect to the antenna output signal component corresponding to $\vec{e_{LHCP}}$ and the antenna output signal component corresponding to $\vec{e_{LHCP}}$ is recombined with the shifted antenna output signal component corresponding to $\vec{e_{RHCP}}$, the resulting composite signal corresponds to the original linearly polarized wave component $\vec{e_2}$. Thus, depending on the introduced relative phase shift, all of the signal energy of either the wave component $\vec{e_1}$ or the wave component $\vec{e_2}$ can be recreated for further receive processing regardless of tilt angle θ without any mechanical reorientation of the aperture of the Earth-based antenna system 108 to align it with the input wave $\vec{e_1}$ and $\vec{e_2}$ polarization orientation.

In some implementations described below, a dual circularly polarized antenna generates separate signals received at the Earth-based antenna system 108 aperture. Polarization transducers of the antenna system 108 may form these separate signals as electromagnetic waves propagating in separate rectangular waveguides. These signals may be routed to low noise amplifiers. The amplifier outputs may be routed to digitally programmable phase shifters and hybrid combiners to perform the above described relative phase shifts and recombination. In implementations described below, these configurations can provide two signal outputs simultaneously, the first composite signal output corresponding to polarization of the $\vec{e_1}$ wave and the second signal output corresponding to the polarization of the $\vec{e_2}$ wave, both transmitted by the satellite 102. In this way, the Earth-based antenna system 108 can simultaneously generate signals corresponding to the polarizations of the waves $\vec{e_1}$ and $\vec{e_2}$ without any mechanical antenna orientation for polarization tracking (although mechanical positioning may still be performed to point the Earth-based antenna system 108 at the satellite 102) and without any loss of signal power due to the tilt angle of the Earth-based antenna system 108 relative to the polarization orientation defined by the satellite transmitted wave.

Transmitting from the Earth-based antenna assembly 106 to the satellite 102 can utilize similar principles. A transmit signal, such as an electromagnetic wave propagating in a coaxial cable, can be split equally, and the two separate signal components can be phase shifted relative to one another by an amount dependent on the currently existing tilt angle θ (e.g., by 2θ or 2θ+π). The two components suitably phase shifted are sent separately to the RHCP antenna port and LHCP antenna port of the dual circularly polarized antenna, where they are converted to an RHCP wave and an LHCP wave at the respective phases by the polarization transducers. When emitted from the antenna aperture, the LHCP and RHCP waves combine to produce a linearly polarized wave having an orientation at the tilt angle θ as defined by the phase shift introduced into the two separated halves of the original transmit signal. The transmitted wave is therefore linearly polarized and aligned with the basis polarization of the satellite antenna system 104.

Figure 1C:
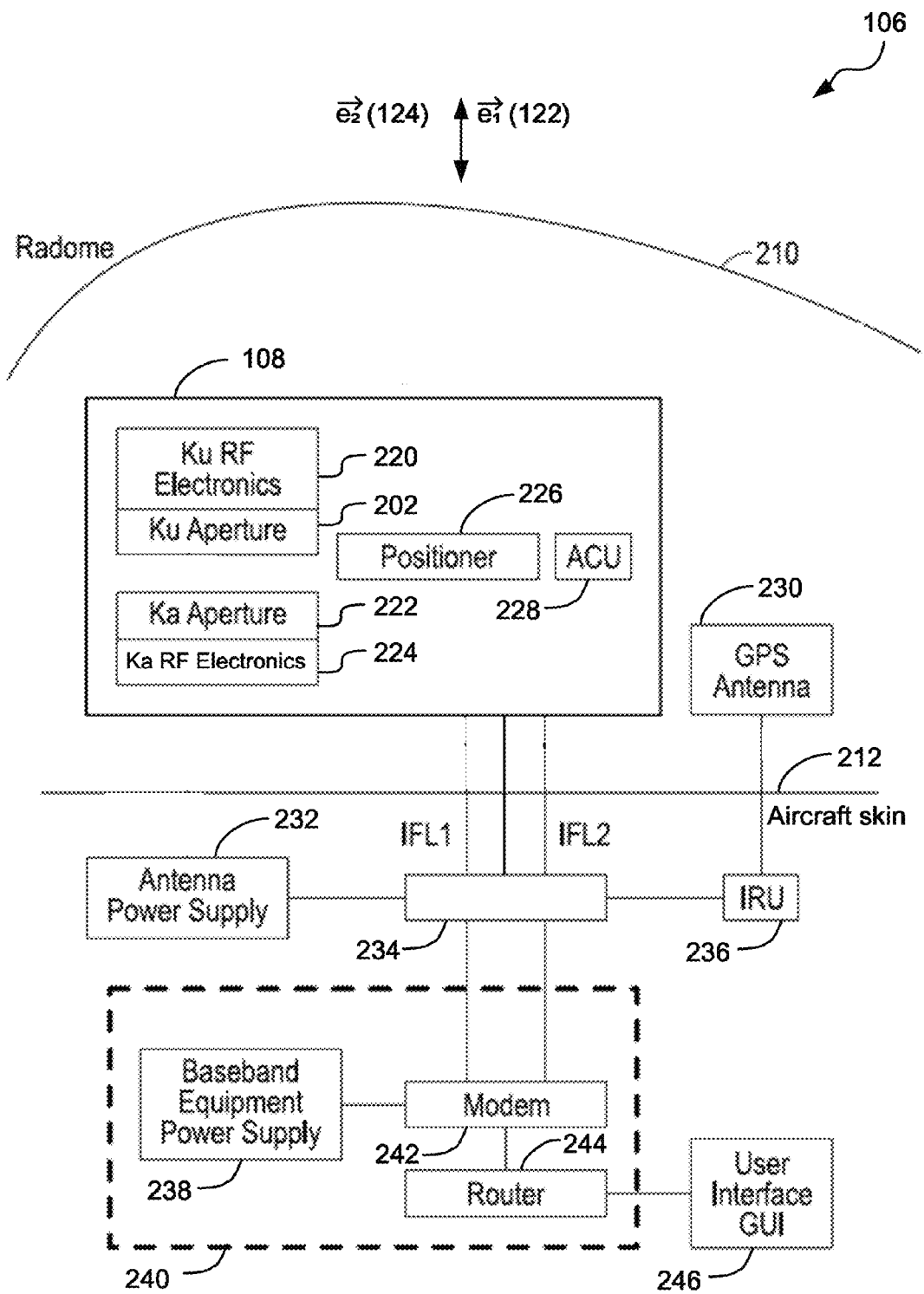
FIG. 1C is a schematic block diagram of an example Earth-based antenna assembly.

Referring to FIG. 1C, a schematic block diagram of an example Earth-based antenna assembly 106 is shown. The example Earth-based antenna assembly 106 of FIG. 1C may include the Earth-based antenna system 108 in FIG. 1A. The Earth-based antenna assembly 106 may include an antenna aperture 202 for Ku-band communication and an antenna aperture 222 for Ka-band communication under a radome 210. For example, the Ku-band aperture 202 antenna may be mounted back-to-back with the Ka-band aperture 222 antenna, with both under the common radome 210 on an aircraft fuselage outside of the overall aircraft skin 212. The illustrated antenna assembly 106 in FIG. 1C also includes a Ku band RF electronics module 220 associated with the Ku-band aperture 202, and a Ka band RF electronics module 224 associated with the Ka aperture 222. RF components such as waveguides and waveguide diplexers may couple the apertures 202 and 222 to their respective electronics modules 220 and 224.

The antenna assembly 106 also comprises a positioner 226 and an antenna control unit (ACU) 228. The positioner 226 may include an elevation motor and gearbox, an elevation alignment sensor, an azimuth motor and gearbox, and an azimuth alignment sensor. These components may be used to point the antenna system at a satellite (such as antenna 102 in FIG. 1A) during operation. In some embodiments, the ACU 228 may be a part of the positioner 226.

A GPS antenna 230 may connect to an inertial reference unit (IRU) 236 in support of providing aircraft position, heading, and orientation information to the ACU 228. The GPS antenna 230 and IRU 236 may be used, in part, to determine the tilt angle θ as the antenna assembly 106 moves due to the movement of the aircraft.

Baseband communication and processing equipment 240 includes a power supply 238, a modem 242, and a router 244. User control may be provided by a user interface 246, which may be a graphical user interface (GUI). Intermediate frequency (IF) transmit and receive signals from the baseband communication and processing equipment 240, as well as DC power from an antenna system power supply 232 and position/orientation information from the IRU 236 are transmitted to and from the antenna assembly 106 via an interface 234.

The Ku RF electronics 220 may further include one or more polarization control networks to achieve a rotatable linear polarization tracking and to correct for polarization distortion caused by the radome 210 as described herein. This is illustrated in more detail with reference to FIG. 2.

Figure 2:
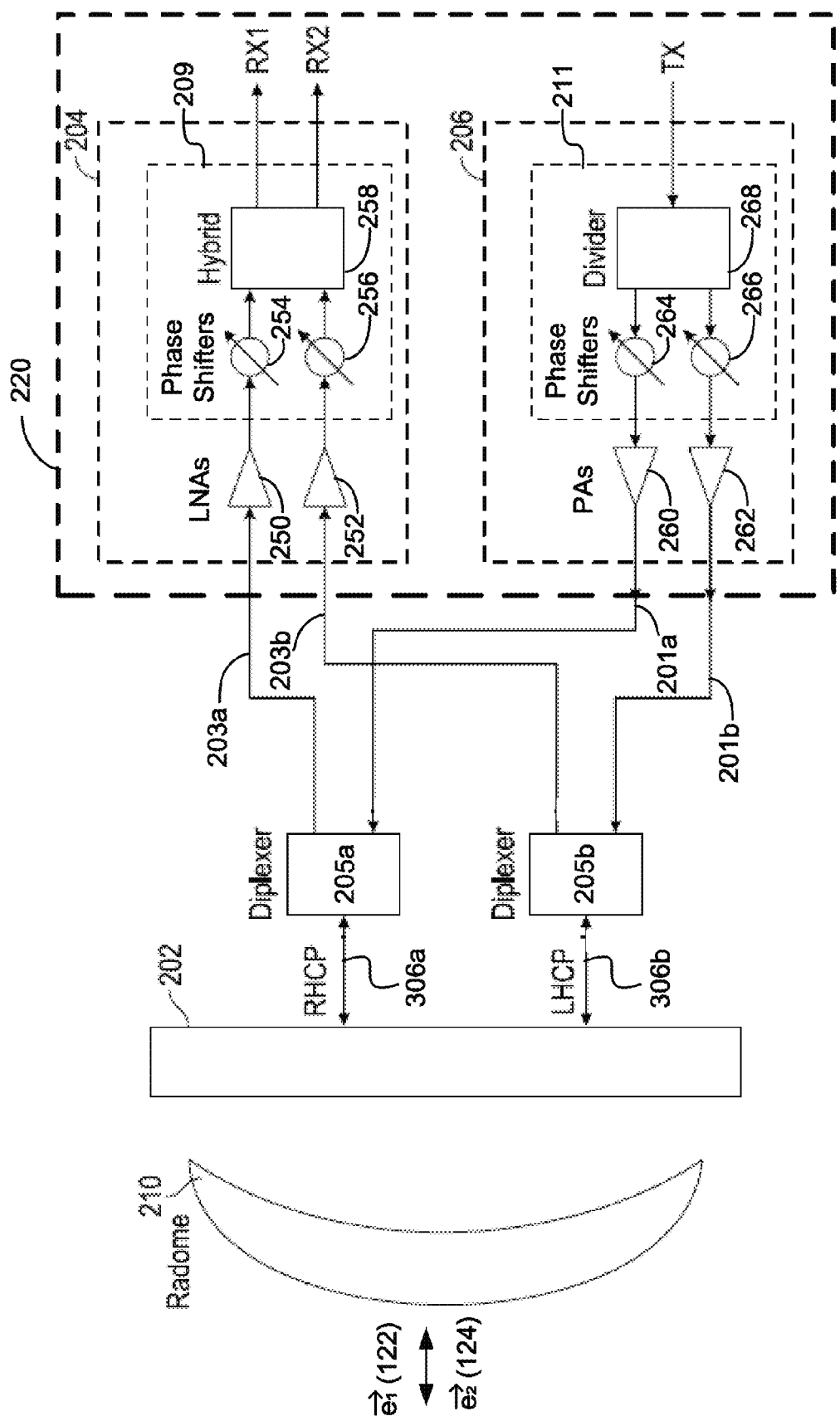
FIG. 2 is a schematic block diagram of the Ku band portion of the example antenna system of FIG. 1C.

Referring to FIG. 2, a schematic block diagram of the Ku band portion of the example antenna system of FIG. 1C is shown. The example implementation of the Ku band aperture 202, electronics module 220, and coupling RF components of FIG. 1C is illustrated and described below. The electronics module 220 includes a receive module 204 and a transmit module 206. The receive module 204 may contain a receive polarization control network 209. The receive module 204 may include a first low noise amplifier (LNA) 250, a second LNA 252, a first receive signal component phase shifter 254, a second receive signal component phase shifter 256, and a hybrid 258. The transmit module 206 may contain a transmit polarization control network 211. The transmit module 206 may include a first power amplifier 260, a second power amplifier 262, a first transmit signal component phase shifter 264, a second transmit signal component phase shifter 266, and a divider 268. The phase shifters 254, 256, 264, and 266 may be digitally controlled to insert tilt angle dependent phase shifts to some or all of their respective signal components.

The aperture 202 may be inherently responsive to circularly polarized incident waves even though the incident wave components $\vec{e_1}$ and $\vec{e_2}$ as transmitted by the satellite are linearly polarized. For example, the aperture 202 may be formed from an array or plurality of polarization transducers which may be septum polarizers as described in more detail below with respect to FIG. 3A. The polarization transducers forming the aperture 202 may have their inputs/outputs coupled to array divider/combiner waveguides 306a and 306b, each of which is coupled to a respective transmit/receive diplexer 205a and 205b. Receive ports 203a and 203b of each diplexer 205 are coupled to respective low noise amplifiers 250 and 252 in the receive module 204. Transmit ports 201a and 201b of each diplexer 205 are coupled to respective solid state power amplifiers 260 and 262 in the transmit module 206.

In some examples, the plurality of polarization transducers generate a plurality of divided first signal components responsive to a first circular polarization of the wave and a plurality of divided second signal components responsive to a second circular polarization of the wave. In such an example, the antenna system may further include a first waveguide power divider/combiner network that combines the plurality of divided first signal components to obtain the first signal component and a second waveguide power divider/combiner network that combines the plurality of divided second signal components to obtain the second signal component.

The first diplexer 205a may receive and deliver signal components received at or to be transmitted by the aperture 202 via a first output port that is inherently responsive to a right-hand circularly polarized wave. Likewise, the second diplexer 205b may receive and deliver signal components received at or transmitted by the aperture 202 via a second output port that is inherently responsive to a left-hand circularly polarized wave.

For receiving, the first diplexer 205a may send the first signal component to the first LNA 250 to be amplified. The amplified first signal component from the first LNA 250 may be sent to the first receive signal component phase shifter 254. The phase shifted first signal component from the first receiver phase shifter 254 may be sent to the hybrid 258. Similarly, the second diplexer 205b may send the second signal component to the second LNA 252 to be amplified. The amplified second signal component from the second LNA 252 may be sent to the second receive signal component phase shifter 256. The phase shifted second signal component from the second transmitter phase shifter 256 may be sent to the hybrid 258.

The hybrid 258 may generate outputs RX1 and RX2 for further processing. Together, the phase shifters 254 and 256 and hybrid 258 apply a relative phase shift to the first and second signal components and combine them in their shifted state. The total phase shift introduced is selected based at least in part on the tilt angle θ and is selected to create composite signals at the hybrid outputs RX1 and RX2 that correspond to $\vec{e}_1$ and $\vec{e}_2$, respectively. As the hybrid 258 is generally fixed with respect to the phase shift it introduces, the phase shifters 254 and 256 are controlled electronically based on the tilt angle θ to appropriately compensate for the tilt angle in combination with the hybrid 258. The total phase shift introduced by the phase shifters and the hybrid may be 2θ and 2θ+π.

Thus, the polarization control network 204 may include the first LNA 250 to amplify the first signal component for input to the first phase shifter 254 and the second LNA 252 to amplify the second signal component for input to the second phase shifter 256. The second phase shift from the second phase shifter 256 may correspond to an equal magnitude phase shift as the first phase shift from the first phase shifter 254, but in an opposite phase shift direction.

For transmitting, the divider 268 may receive a transmit (TX) signal to be transmitted and may generate two outputs, the first of which is sent to the first transmit signal component phase shifter 264 and the second of which is sent to the second transmit signal component phase shifter 266. The first phase shifted output from the first transmitter phase shifter 264 may be sent to the first power amplifier 260. The first amplified signal output from the first power amplifier 260 may be sent to the first diplexer 205a. The first diplexer 205a may send the signal component from the amplifier 260 output to the aperture 202. Likewise, the second phase shifted output from the second transmitter phase shifter 266 may be sent to the second power amplifier 262. The second amplified signal output from the second power amplifier 262 may be sent to the second diplexer 205b. The second diplexer 205b may send the signal component from the amplifier 262 output to the aperture 202. Similar to the receive mode, but without the phase shift contribution of a hybrid, the phase shifters 254 and 256 are electronically controlled to apply a relative phase shift to the first and second signal components. The total phase shift introduced is selected based at least in part on the tilt angle θ and is selected to create a linearly polarized transmit wave at the antenna aperture that is aligned with the basis polarization of the satellite antenna system 104. The total phase shift introduced by the phase shifters 264 and 266 and the divider 268 may be 2θ. In the illustrated example, the transmit module 206 obtains a single transmit signal, and thus the aperture 202 subsequently radiates a single linearly polarized wave. In alternative embodiments, the transmit module 206 is configured to obtain two transmit signals. In such a case, the two transmit signals are divided and phase adjusted, such that the aperture 210 subsequently radiates two linearly polarized waves.

The radome 210 may cover the aperture 202 and may be curved to conform to a specific aerodynamic profile. The known physical and electrical properties may be used to characterize the electrical responses for a perfect CP signal (RHCP or LHCP). The radome 210 may cause depolarization of the waves propagating through the layers of the radome 210. The presence of the radome 210 may be compensated for by modifying the phase shift adjustments applied by the polarization control networks 204, 206 to process incoming and outgoing waves. The technology described herein involving the radome 210 will be discussed further below.

Another example Earth-based antenna assembly 106 may include a second polarization control network that forms a third signal component and a fourth signal component from a transmit signal that corresponds to a second linear polarization of a second wave, wherein the third signal component and the fourth signal component have equal amplitude. The second polarization control network may also apply a second phase difference between the third signal component and the fourth signal component to generate an adjusted third signal component and an adjusted fourth signal component, wherein the applied second phase difference is based on the orientation of the second linear polarization of the second wave relative to the antenna system. The second polarization control network may further provide the adjusted third signal component and the adjusted fourth signal component to the plurality of polarization transducers to transmit the second wave having the second linear polarization from the antenna system.

The Earth-based antenna assembly 106 may further include a first diplexer 205a having a common port coupled with first divided waveguide ports of the plurality of polarization transducers that are responsive to a first circular polarization, the first diplexer 205a having a first frequency band port to output the first signal component and a second frequency band port to input an adjusted third signal component. The Earth-based antenna assembly 106 may also include a second diplexer having a common port coupled with second divided waveguide ports of the plurality of polarization transducers that are responsive to a second circular polarization, the second diplexer having a first frequency band port to output the second signal component and a second frequency band port to input the adjusted fourth signal component. In some examples, the first wave is in a first frequency band and the second wave is in a second frequency band that is different from the first frequency band.

Figure 3A:
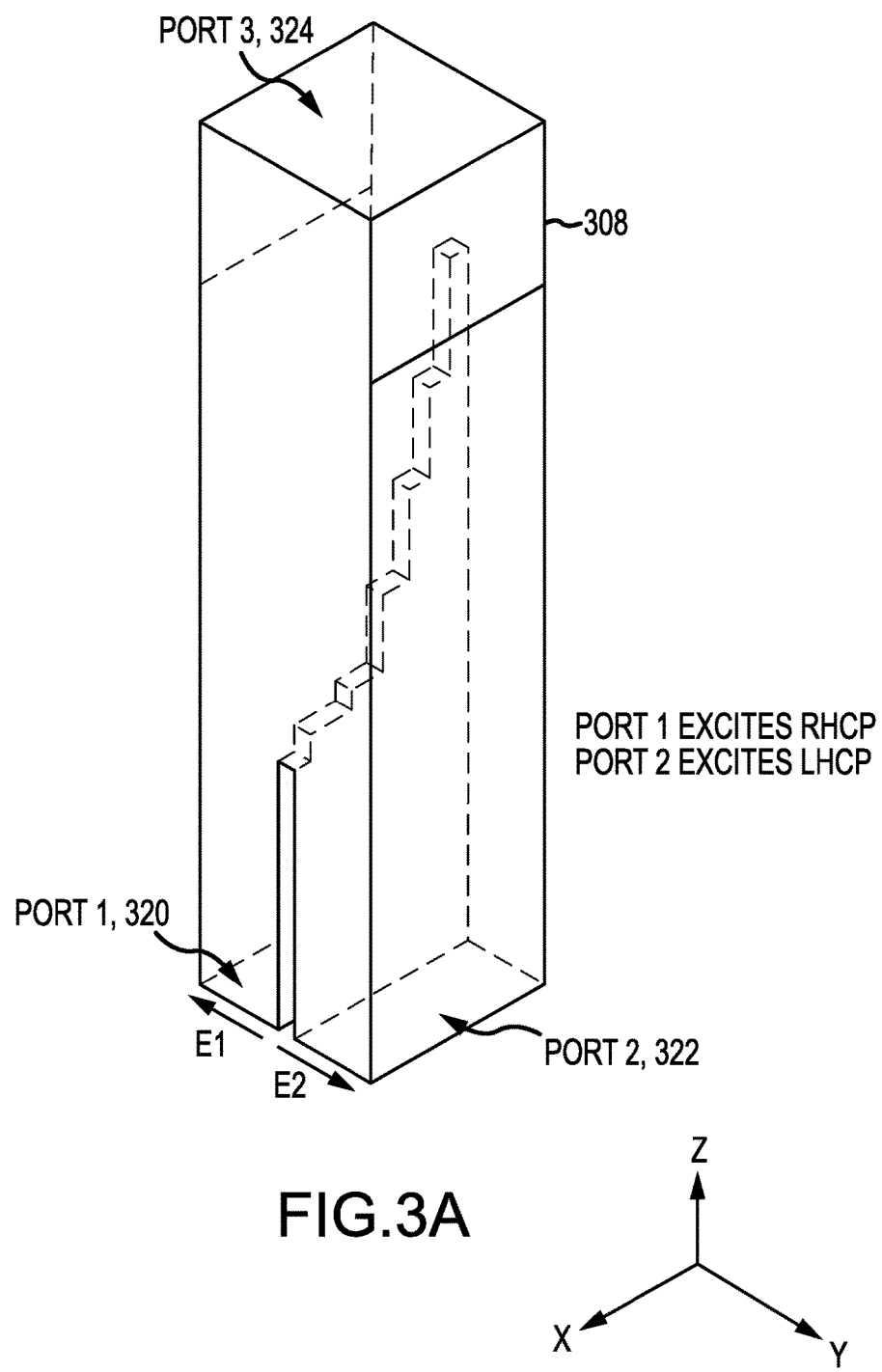
FIG. 3A is an illustration of an example polarization transducer.

The aperture 202 may be comprised of an array of polarization transducers. Referring now to FIGS. 3A through 3D, each polarization transducer may be a septum polarizer, although other designs may be used. FIG. 3A is an illustration of an example polarization transducer, which may be a septum polarizer 308. The septum polarizer 308 may be implemented as a sloped or stepped septum polarizer (SSP) and coupled to a beam forming network (BFN)/array combiner 306 (see FIG. 3B). Port 1 (320) and Port 2 (322) excitations (e.g., $TE_{10}$ mode signals received at Port 1 and Port 2 from waveguide networks 306a and 306b, respectively) result in corresponding RHCP and LHCP waves emitted from Port 3 (324). Similarly, RHCP and LHCP waves incident on Port 3 (324) produce output signals (e.g., $TE_{10}$ mode excitation at waveguides 306a and 306b respectively attached to Port 1 (320) and Port 2 (322)). The septum polarizer 308 is a dual-band device performing over two frequency band segments. A receive band can be 10.95 to 12.75 GHz and a transmit band can be 14.0 to 14.5 GHz. As discussed above, the aperture 202 may include an array of septum polarizers 308. Signals to and from each Port 1 of the multiple septum polarizers 308 may be combined in array combiner waveguides 306a to transmit and receive RHCP waves. Similarly, signals to and from each Port 2 of the multiple septum polarizers 308 may be combined in another array combiner waveguides 306b to transmit and receive LHCP waves.

Figure 3B:
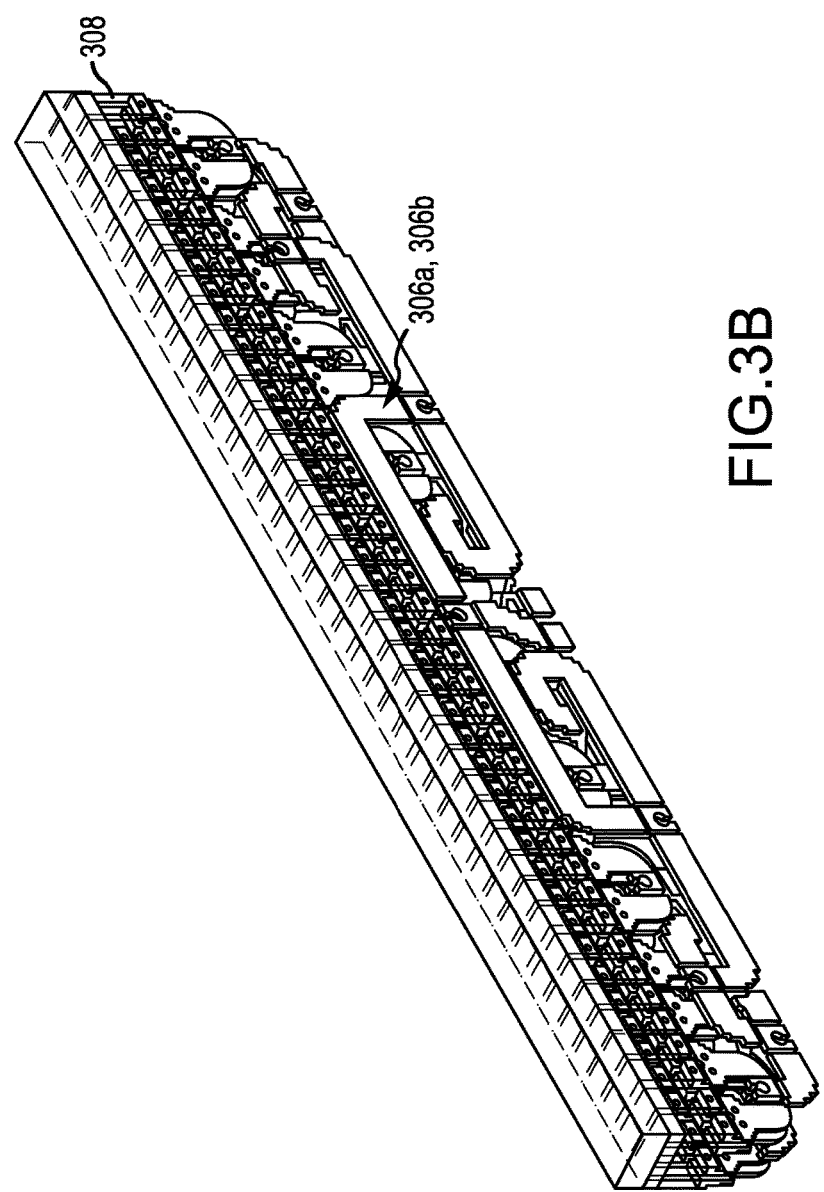
FIG. 3B is an example perspective view of a portion of an array of septum polarizers and associated array combiner waveguides.

Referring to FIG. 3B, a perspective view of a portion of an array of septum polarizers and associated array combiner waveguides according to one embodiment is shown. The waveguide system may include the septum polarizer transducers 308 and the array combiners 306a and 306b. The antenna aperture 202 (FIG. 2) may include a waveguide manifold comprising waveguide radiating elements stacked in multiple rows and columns. Each radiating element may be a square waveguide aperture connected to a dual-output septum polarizer similar to the septum polarizer transducer 308. As shown in FIG. 3B, x and y dimensions fixed to the Earth-based antenna system 108 (such as the x and y axes of FIG. 1B) may be defined with respect to the orientation of the aperture of the antenna. In the example of FIG. 3B, the x axis is aligned along the septum widths.

FIGS. 3C and 3D are two views of an example antenna system 108. FIG. 3C is an example array of polarization transducers, array combiner, diplexers, receive, and transmit electronics in a unit. FIG. 3D is a front view of the unit of FIG. 3C. The illustrated example antenna system 108 includes the aperture 202, the diplexers 205a and 205b, the receive module 204, and the transmit module 206. Two Tx and two Rx ports are shown where the waveguides terminate at the electronics modules at ports 201a, 201b, 203a, and 203b.

It is to be noted that the particular locations of components and the design of the example antenna system 108 are shown only for illustrative purposes, and the technology described herein may be implemented in various ways not explicitly depicted herein.

Figure 4A:
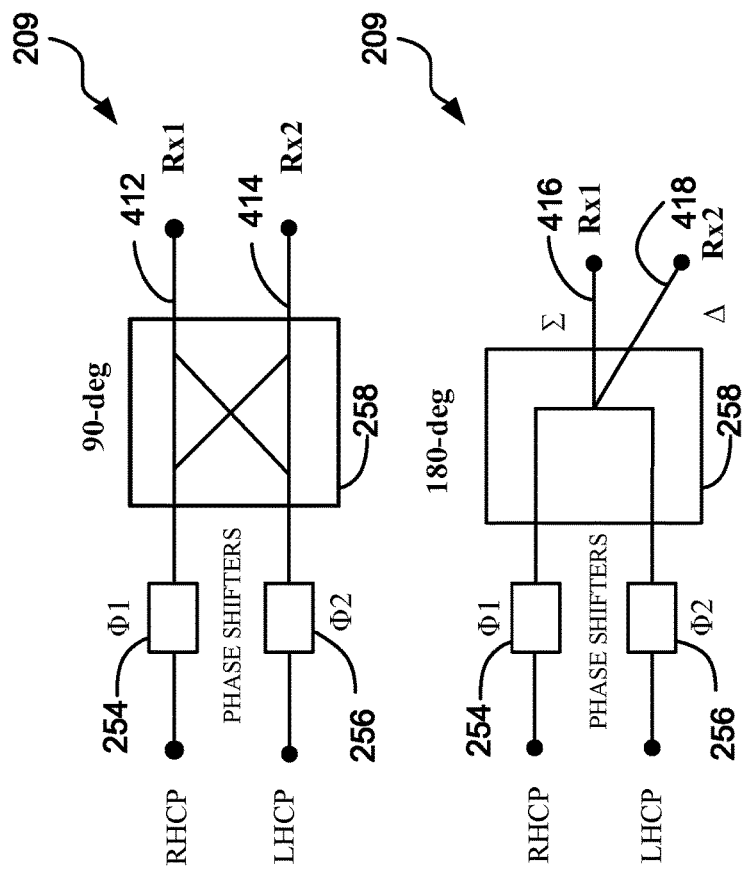
FIG. 4A shows functional block diagrams of example receive polarization control networks.

Referring to FIG. 4A, functional block diagrams of two example receive polarization control networks 209 are described below. The receive polarization control network 209 may include a first receive signal component phase shifter 254, a second receive signal component phase shifter 256, and a hybrid 258. The receive polarization control network 209 may be implemented using a 90-degree hybrid (labeled "90-deg") or a 180-degree hybrid as illustrated in the two alternatives in FIG. 4A. The receiver polarization controller 204 may take in signal components received from Port 1 (320) and Port 2 (322) of the septum polarizers from the low noise amplifiers 250 and 252, for example. These signal components may be phase shifted with the two receive signal component phase shifters 254, 256 before they are fed to the hybrid 258. For the polarization control network with the 180 degree hybrid (labeled "180 degree"), the phase shifters 254, 256 can introduce equal and opposite phase shifts, each equal to the tilt angle θ. The sum output from output Rx1 416 will be a composite signal corresponding to the polarization of the original linear polarized input wave $\vec{e}_1$ with the tilt angle removed. The difference output from output Rx2 418 will have another phase shift of it introduced by the hybrid, and will be a composite signal corresponding to the polarization of the original linear polarized input wave $\vec{e}_2$ with the tilt angle removed. When a 90 degree hybrid is used, the phase shifters 254, 256 introduce an extra n/2 relative shift in addition to the angle θ, and the 90 degree hybrid removes the extra π/2 for the Rx1 output 412, or adds another π/2 relative shift for the Rx2 output 414. The systems illustrated with these figures implement equal and opposite phase shifts into the two components to produce a total phase shift of the desired amount. It would also be possible to design systems that only shift one of the two signals the entire amount, or use a non-symmetric phase shift on the two signal components.

The 90-degree hybrid illustrated in the top diagram of FIG. 4A may generate two port signals for orthogonal electric field components $\vec{e}_1$ and $\vec{e}_2$ as follows:

$$\overrightarrow{e_{LHCP}} = \frac{1}{\sqrt{2}}[\vec{e_x} + j\vec{e_y}] = \frac{1}{\sqrt{2}}\left[\vec{e_x} + \vec{e_y}e^{j\frac{\pi}{2}}\right] \quad (1)$$

$$\overrightarrow{e_{RHCP}} = \frac{1}{\sqrt{2}}[\vec{e_x} - j\vec{e_y}] = \frac{1}{\sqrt{2}}\left[\vec{e_x} + \vec{e_y}e^{-j\frac{\pi}{2}}\right] \quad (2)$$

$$\vec{e_1} = \frac{1}{\sqrt{2}}e^{-j\phi_1}\overrightarrow{e_{RHCP}} + \frac{1}{\sqrt{2}}e^{-j\phi_2}\overrightarrow{e_{LHCP}}e^{-j\frac{\pi}{2}} \quad (3)$$

$$\vec{e_2} = \frac{1}{\sqrt{2}}e^{-j\phi_2}\overrightarrow{e_{LHCP}} + \frac{1}{\sqrt{2}}e^{-j\phi_1}\overrightarrow{e_{RHCP}}e^{-j\frac{\pi}{2}} \quad (4)$$

$$\vec{e_1} = \frac{1}{\sqrt{2}}e^{-j\frac{1}{2}(\phi_1+\phi_2)} \quad (5)$$

$$e^{-j\frac{\pi}{4}}\left[\overrightarrow{e_{RHCP}}e^{+j\frac{\pi}{4}}e^{-j\frac{1}{2}(\phi_1-\phi_2)} + \overrightarrow{e_{LHCP}}e^{-j\frac{\pi}{4}}e^{+j\frac{1}{2}(\phi_1-\phi_2)}\right]$$

$$\vec{e_2} = \frac{1}{\sqrt{2}} e^{-j\frac{1}{2}(\phi_1+\phi_2)} \quad (6)$$
$$e^{-j\frac{\pi}{4}} \left[ \overline{e_{LHCP}} e^{+j\frac{\pi}{4}} e^{+j\frac{1}{2}(\phi_1-\phi_2)} + \overline{e_{RHCP}} e^{-j\frac{\pi}{4}} e^{-j\frac{1}{2}(\phi_1-\phi_2)} \right]$$

$$\vec{e_1} = \frac{1}{2} e^{-j\frac{1}{2}(\phi_1+\phi_2)} e^{-j\frac{\pi}{4}} \quad (7)$$
$$\left\{ \left[ \vec{e_x} + \vec{e_y} e^{-j\frac{\pi}{2}} \right] e^{+j\frac{\pi}{4}} e^{-j\frac{1}{2}(\phi_1-\phi_2)} + \left[ \vec{e_x} + \vec{e_y} e^{j\frac{\pi}{2}} \right] e^{-j\frac{\pi}{4}} e^{+j\frac{1}{2}(\phi_1-\phi_2)} \right\}$$

$$\vec{e_2} = \frac{1}{2} e^{-j\frac{1}{2}(\phi_1+\phi_2)} e^{-j\frac{\pi}{4}} \quad (8)$$
$$\left\{ \left[ \vec{e_x} + \vec{e_y} e^{-j\frac{\pi}{2}} \right] e^{+j\frac{\pi}{4}} e^{+j\frac{1}{2}(\phi_1-\phi_2)} + \left[ \vec{e_x} + \vec{e_y} e^{-j\frac{\pi}{2}} \right] e^{-j\frac{\pi}{4}} e^{-j\frac{1}{2}(\phi_1-\phi_2)} \right\}$$

$$\vec{e_1} = \frac{1}{2} e^{-j\frac{1}{2}(\phi_1+\phi_2)} e^{-j\frac{\pi}{4}} \left\{ \vec{e_x} \left[ e^{+j\frac{\pi}{4}} e^{-j\frac{1}{2}(\phi_1-\phi_2)} + e^{-j\frac{\pi}{4}} e^{+j\frac{1}{2}(\phi_1-\phi_2)} \right] + \right. \quad (9)$$
$$\left. \vec{e_y} \left[ e^{-j\frac{\pi}{2}} e^{+j\frac{\pi}{4}} e^{-j\frac{1}{2}(\phi_1-\phi_2)} + e^{j\frac{\pi}{2}} e^{-j\frac{\pi}{4}} e^{+j\frac{1}{2}(\phi_1-\phi_2)} \right] \right\}$$

$$\vec{e_2} = \frac{1}{2} e^{-j\frac{1}{2}(\phi_1+\phi_2)} e^{-j\frac{\pi}{4}} \left\{ \vec{e_x} \left[ e^{+j\frac{\pi}{4}} e^{+j\frac{1}{2}(\phi_1-\phi_2)} + e^{-j\frac{\pi}{4}} e^{-j\frac{1}{2}(\phi_1-\phi_2)} \right] + \right. \quad (10)$$
$$\left. \vec{e_y} \left[ e^{+j\frac{\pi}{2}} e^{+j\frac{\pi}{4}} e^{+j\frac{1}{2}(\phi_1-\phi_2)} + e^{-j\frac{\pi}{2}} e^{-j\frac{\pi}{4}} e^{-j\frac{1}{2}(\phi_1-\phi_2)} \right] \right\}$$

$$\vec{e_1} = \frac{1}{2} e^{-j\frac{1}{2}(\phi_1+\phi_2)} e^{-j\frac{\pi}{4}} \left\{ \vec{e_x} \left[ e^{-j[\frac{1}{2}(\phi_1-\phi_2)-\frac{\pi}{4}]} + e^{+j[\frac{1}{2}(\phi_1-\phi_2)-\frac{\pi}{4}]} \right] + \right. \quad (11)$$
$$\left. \vec{e_y} \left[ e^{-j[\frac{1}{2}(\phi_1-\phi_2)+\frac{\pi}{4}]} + e^{+j[\frac{1}{2}(\phi_1-\phi_2)+\frac{\pi}{4}]} \right] \right\}$$

$$\vec{e_2} = \frac{1}{2} e^{-j\frac{1}{2}(\phi_1+\phi_2)} e^{-j\frac{\pi}{4}} \left\{ \vec{e_x} \left[ e^{+j[\frac{1}{2}(\phi_1-\phi_2)+\frac{\pi}{4}]} + e^{-j[\frac{1}{2}(\phi_1-\phi_2)+\frac{\pi}{4}]} \right] + \right. \quad (12)$$
$$\left. \vec{e_y} \left[ e^{+j[\frac{1}{2}(\phi_1-\phi_2)+\frac{3\pi}{4}]} + e^{-j[\frac{1}{2}(\phi_1-\phi_2)+\frac{3\pi}{4}]} \right] \right\}$$

The linear polarization operation, $\vec{e_1}$ and $\vec{e_2}$, which are the composite signals output from outputs 412 and 414 of the 90 degree hybrid in FIG. 4A, may finally be expressed as below:

$$\vec{e_1} = e^{-j\frac{1}{2}(\phi_1+\phi_2)} e^{-j\frac{\pi}{4}} \quad (13)$$
$$\left\{ \vec{e_x} \cos\left[\frac{1}{2}(\phi_1-\phi_2) - \frac{\pi}{4}\right] + \vec{e_y} \cos\left[\frac{1}{2}(\phi_1-\phi_2) + \frac{\pi}{4}\right] \right\}$$

$$\vec{e_2} = e^{-j\frac{1}{2}(\phi_1+\phi_2)} e^{-j\frac{\pi}{4}} \quad (14)$$
$$\left\{ \vec{e_x} \cos\left[\frac{1}{2}(\phi_1-\phi_2) + \frac{\pi}{4}\right] + \vec{e_y} \cos\left[\frac{1}{2}(\phi_1-\phi_2) + \frac{3\pi}{4}\right] \right\}$$

The 180-degree hybrid illustrated in the bottom diagram of FIG. 5A may generate two port signals, one sum port and one difference port, for orthogonal electric field components $\vec{e_1}$ and $\vec{e_2}$ as follows $$\vec{e_1} = \frac{1}{\sqrt{2}} e^{-j\phi_1} \overline{e_{RHCP}} + \frac{1}{\sqrt{2}} e^{-j\phi_2} \overline{e_{LHCP}} \quad (15)$$

$$\vec{e_2} = \frac{1}{\sqrt{2}} e^{-j\phi_2} \overline{e_{LHCP}} - \frac{1}{\sqrt{2}} e^{-j\phi_1} \overline{e_{RHCP}} \quad (16)$$

$$\vec{e_1} = \frac{1}{\sqrt{2}} e^{-j\frac{1}{2}(\phi_1+\phi_2)} \left[ \overline{e_{RHCP}} e^{-j\frac{1}{2}(\phi_1-\phi_2)} + \overline{e_{LHCP}} e^{+\frac{1}{2}(\phi_1-\phi_2)} \right] \quad (17)$$

$$\vec{e_2} = \frac{1}{\sqrt{2}} e^{-j\frac{1}{2}(\phi_1+\phi_2)} \left[ \overline{e_{LHCP}} e^{+j\frac{1}{2}(\phi_1-\phi_2)} - \overline{e_{RHCP}} e^{-\frac{1}{2}(\phi_1-\phi_2)} \right] \quad (18)$$

$$\vec{e_1} = \quad (19)$$
$$\frac{1}{2} e^{-j\frac{1}{2}(\phi_1+\phi_2)} \left\{ \left[ \vec{e_x} + \vec{e_y} e^{-j\frac{\pi}{2}} \right] e^{-j\frac{1}{2}(\phi_1-\phi_2)} + \left[ \vec{e_x} + \vec{e_y} e^{j\frac{\pi}{2}} \right] e^{+j\frac{1}{2}(\phi_1-\phi_2)} \right\}$$

$$\vec{e_2} = \quad (20)$$
$$\frac{1}{2} e^{-j\frac{1}{2}(\phi_1+\phi_2)} \left\{ \left[ \vec{e_x} + \vec{e_y} e^{j\frac{\pi}{2}} \right] e^{+j\frac{1}{2}(\phi_1-\phi_2)} - \left[ \vec{e_x} + \vec{e_y} e^{-j\frac{\pi}{2}} \right] e^{-j\frac{1}{2}(\phi_1-\phi_2)} \right\}$$

$$\vec{e_1} = \frac{1}{2} e^{-j\frac{1}{2}(\phi_1+\phi_2)} \left\{ \vec{e_x} \left[ e^{-j\frac{1}{2}(\phi_1-\phi_2)} + e^{+j\frac{1}{2}(\phi_1-\phi_2)} \right] + \right. \quad (21)$$
$$\left. \vec{e_y} \left[ e^{-j\frac{\pi}{2}} e^{-j\frac{1}{2}(\phi_1-\phi_2)} + e^{j\frac{\pi}{2}} e^{+j\frac{1}{2}(\phi_1-\phi_2)} \right] \right\}$$

$$\vec{e_2} = \frac{1}{2} e^{-j\frac{1}{2}(\phi_1+\phi_2)} \left\{ \vec{e_x} \left[ e^{+j\frac{1}{2}(\phi_1-\phi_2)} - e^{-j\frac{1}{2}(\phi_1-\phi_2)} \right] + \right. \quad (22)$$
$$\left. \vec{e_y} \left[ e^{+j\frac{\pi}{2}} e^{+j\frac{1}{2}(\phi_1-\phi_2)} - e^{-j\frac{\pi}{2}} e^{-j\frac{1}{2}(\phi_1-\phi_2)} \right] \right\}$$

$$\vec{e_1} = \frac{1}{2} e^{-j\frac{1}{2}(\phi_1+\phi_2)} \left\{ \vec{e_x} \left[ e^{-j[\frac{1}{2}(\phi_1-\phi_2)]} + e^{+j[\frac{1}{2}(\phi_1-\phi_2)]} \right] + \right. \quad (23)$$
$$\left. \vec{e_y} \left[ e^{-j[\frac{1}{2}(\phi_1-\phi_2)+\frac{\pi}{2}]} + e^{+j[\frac{1}{2}(\phi_1-\phi_2)+\frac{\pi}{2}]} \right] \right\}$$

$$\vec{e_2} = \frac{1}{2} e^{-j\frac{1}{2}(\phi_1+\phi_2)} \left\{ \vec{e_x} \left[ e^{+j[\frac{1}{2}(\phi_1-\phi_2)]} - e^{-j[\frac{1}{2}(\phi_1-\phi_2)]} \right] + \right. \quad (24)$$
$$\left. \vec{e_y} \left[ e^{+j[\frac{1}{2}(\phi_1-\phi_2)+\frac{\pi}{2}]} - e^{-j[\frac{1}{2}(\phi_1-\phi_2)+\frac{\pi}{2}]} \right] \right\}$$

$$\vec{e_1} = e^{-j\frac{1}{2}(\phi_1+\phi_2)} \left\{ \vec{e_x} \cos\left[\frac{1}{2}(\phi_1-\phi_2)\right] + \vec{e_y} \cos\left[\frac{1}{2}(\phi_1-\phi_2) + \frac{\pi}{2}\right] \right\} \quad (25)$$

$$\vec{e_2} = e^{-j\frac{1}{2}(\phi_1+\phi_2)} e^{j\frac{\pi}{4}} \left\{ \vec{e_x} \sin\left[\frac{1}{2}(\phi_1-\phi_2)\right] + \vec{e_y} \sin\left[\frac{1}{2}(\phi_1-\phi_2) + \frac{\pi}{2}\right] \right\} \quad (26)$$

For linear polarization operation, $\vec{e_1}$ and $\vec{e_2}$, which are the composite signals output from outputs 416 and 418 of the 180 degree hybrid in FIG. 4A, may finally be expressed as below:

$$\vec{e_1} = e^{-j\frac{1}{2}(\phi_1+\phi_2)} \left\{ \vec{e_x} \cos\left[\frac{1}{2}(\phi_1-\phi_2)\right] + \vec{e_y} \sin\left[\frac{1}{2}(\phi_1-\phi_2)\right] \right\} \quad (27)$$

$$\vec{e_2} = e^{-j\frac{1}{2}(\phi_1+\phi_2)} \left\{ \vec{e_x} \sin\left[\frac{1}{2}(\phi_1-\phi_2)\right] - \vec{e_y} \cos\left[\frac{1}{2}(\phi_1-\phi_2)\right] \right\} \quad (28)$$

Figure 4B:
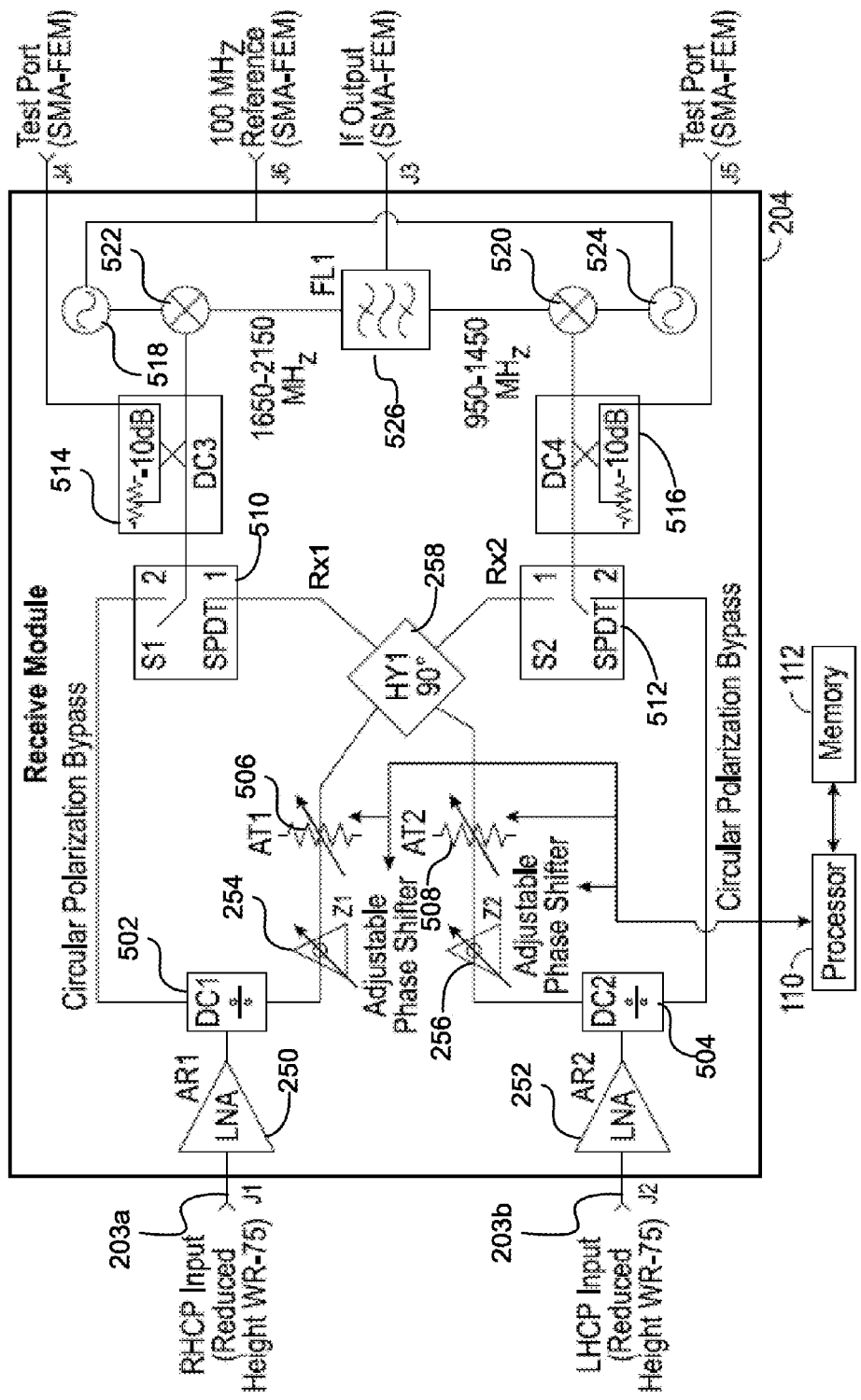
FIG. 4B is a schematic block diagram of an example receive module using the polarization control network with the 90 degree hybrid of FIG. 4A.

Referring to FIG. 4B, a schematic block diagram of an example receive module using the polarization control network with the 90 degree hybrid of FIG. 4A is described below. The illustrated receive module 204 includes the receiver polarization control network 209 in communication with the processor 110 and the memory 112. The receive module 204 may include the first and second LNAs AR1 (250), AR2 (252), power dividers DC1 (502), DC2 (504) (which allow for operation with received circularly polarized signals if desired), variable phase shifters Z1 (the first receive signal component phase shifter 254) and Z2 (the second receive signal component phase shifter 256), variable power attenuators AT1 (506), AT2 (508), a hybrid HY1 (258), couplers DC3 (514), DC4 (516), switches S1 (510), S2 (512), mixers 520, 522, local oscillators 518, 524, and a diplexer FL1 (526). The illustrated receive module 204 includes a 90-degree hybrid 258, and the signal components as shifted by the phase shifters 254 and 256 may be combined in the 90-degree (phase quadrature) hybrid to produce the composite signals RX1 and RX2. In another embodiment, the receive module 204 may include a 180- degree hybrid instead of the 90-degree hybrid. As described above, the total phase shift introduced is selected based at least in part on the tilt angle θ and is selected to create composite signals at the hybrid outputs RX1 and RX2 that correspond to $\vec{e}_1 + \vec{e}_2$, respectively.

The variable attenuators 506, 508 are not utilized for polarization tracking in the sense that the attenuation introduced by them is not tilt angle dependent. These attenuators are instead provided so that LNA gain differences and/or propagation length differences resulting in different amounts of signal loss and gain for the signal paths may be compensated by the variable attenuators 506, 508. The processor 110 may be configured to provide commands to adjust the phase shift introduced by the variable phase shifters 254, 256 based at least in part on the tilt angle as determined, for example, by the GPS and IRU unit (FIG. 2). The processor 110 may further be configured to adjust the variable power attenuators 506, 508 of the receiver polarization control network 204. The processor 110 may further be configured to adjust the variable phase shifters 254, 256 and the variable power attenuators 506, 508 to take into account other errors that may be introduced to the system, such as may be produced by the presence of the radome 210.

Figure 5A:
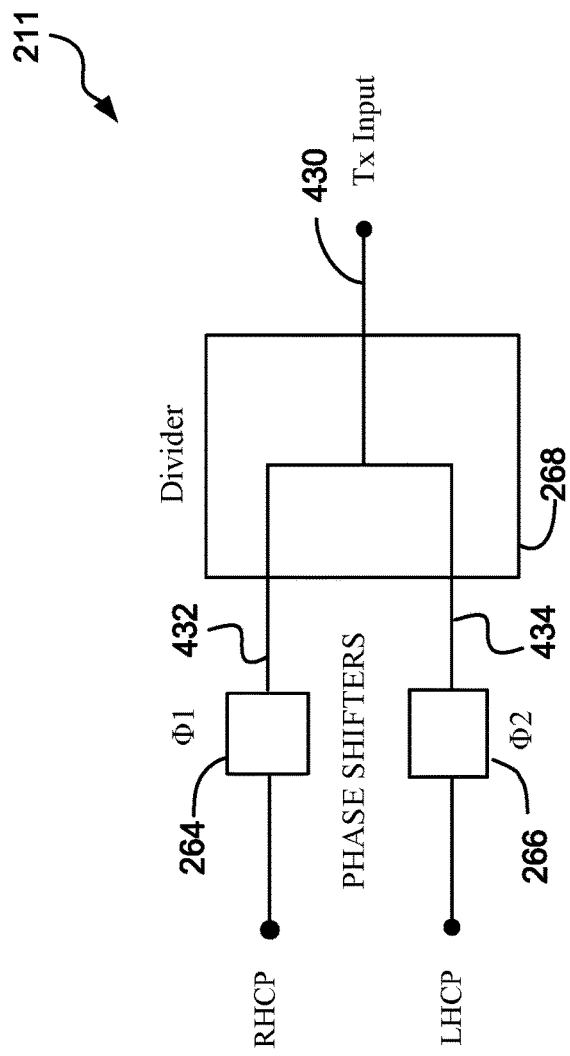
FIG. 5A is a schematic block diagram of a transmit polarization control network.

Referring to FIG. 5A, a schematic block diagram of a transmit polarization control network is described below. The transmit polarization control network 211 may be implemented using the divider 268 (e.g., an in-phase divider) as illustrated in FIG. 5A. The in-phase divider 268 may be a Wilkinson type having one or more internal termination resistors for out of phase reflected signals appearing on the output ports 432, 434 and may function substantially similarly to the 180-degree hybrid discussed above with only sum port excitation and difference port terminated preferably in a matched load. The transmit polarization control network 211 may receive a transmit input signal (Tx input) at port 430 which is split by the divider 268 into two equal amplitude signal components. The two signal components may be phase shifted with the two transmit signal component phase shifters 264, 266 to generate signal components to be routed to Port 1 (320) and Port 2 (322) of the septum polarizers of the array after amplification by the power amplifiers 260 and 262, for example. As described above, the total phase shift introduced is selected based at least in part on the tilt angle θ and is selected to create a linearly polarized transmit wave at the antenna aperture that is aligned with the basis polarization of the satellite antenna system 104.

Figure 5B:
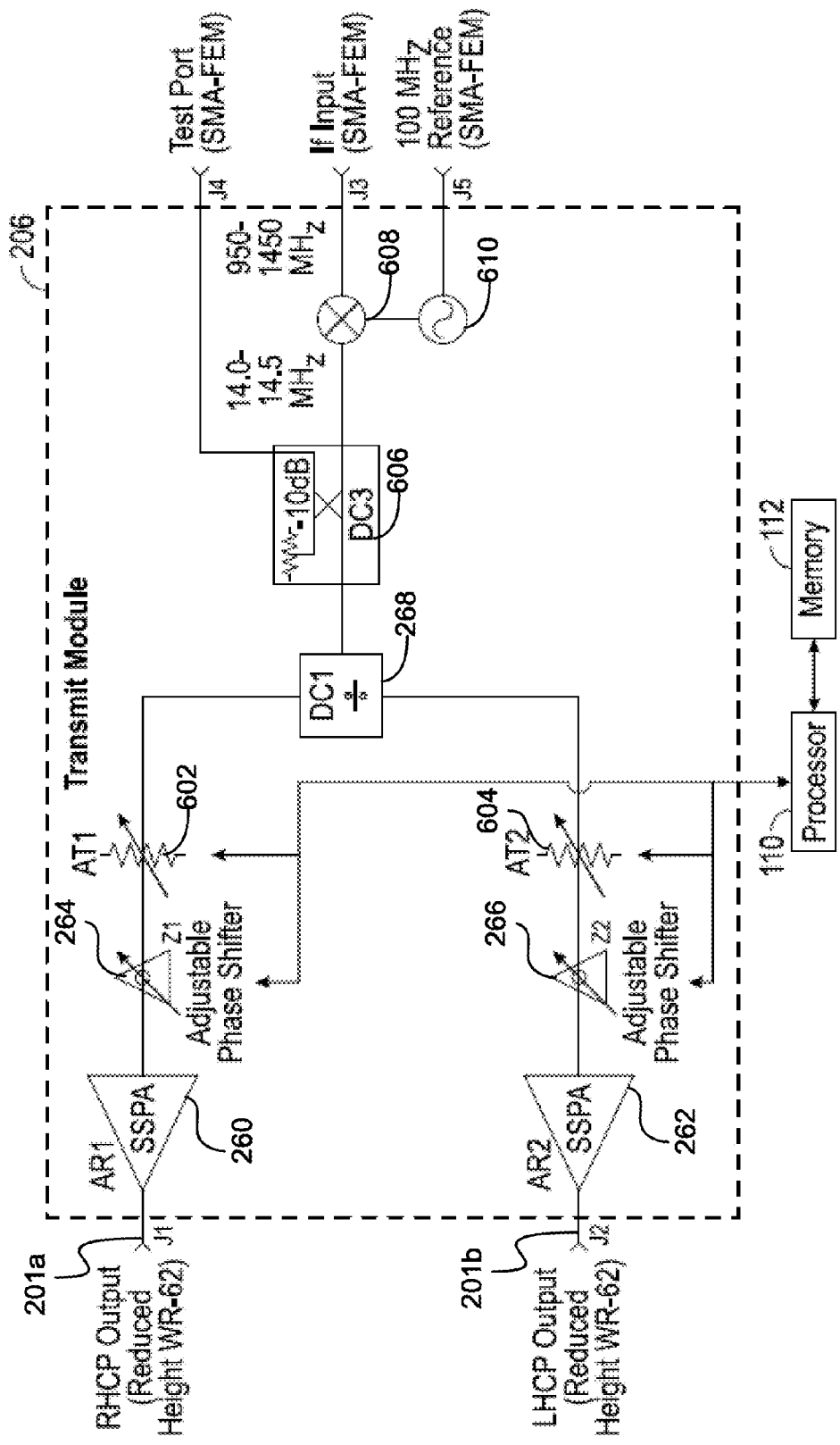
FIG. 5B is a schematic block diagram of an example transmit module using the polarization control network of FIG. 5A.
Figure 6A:
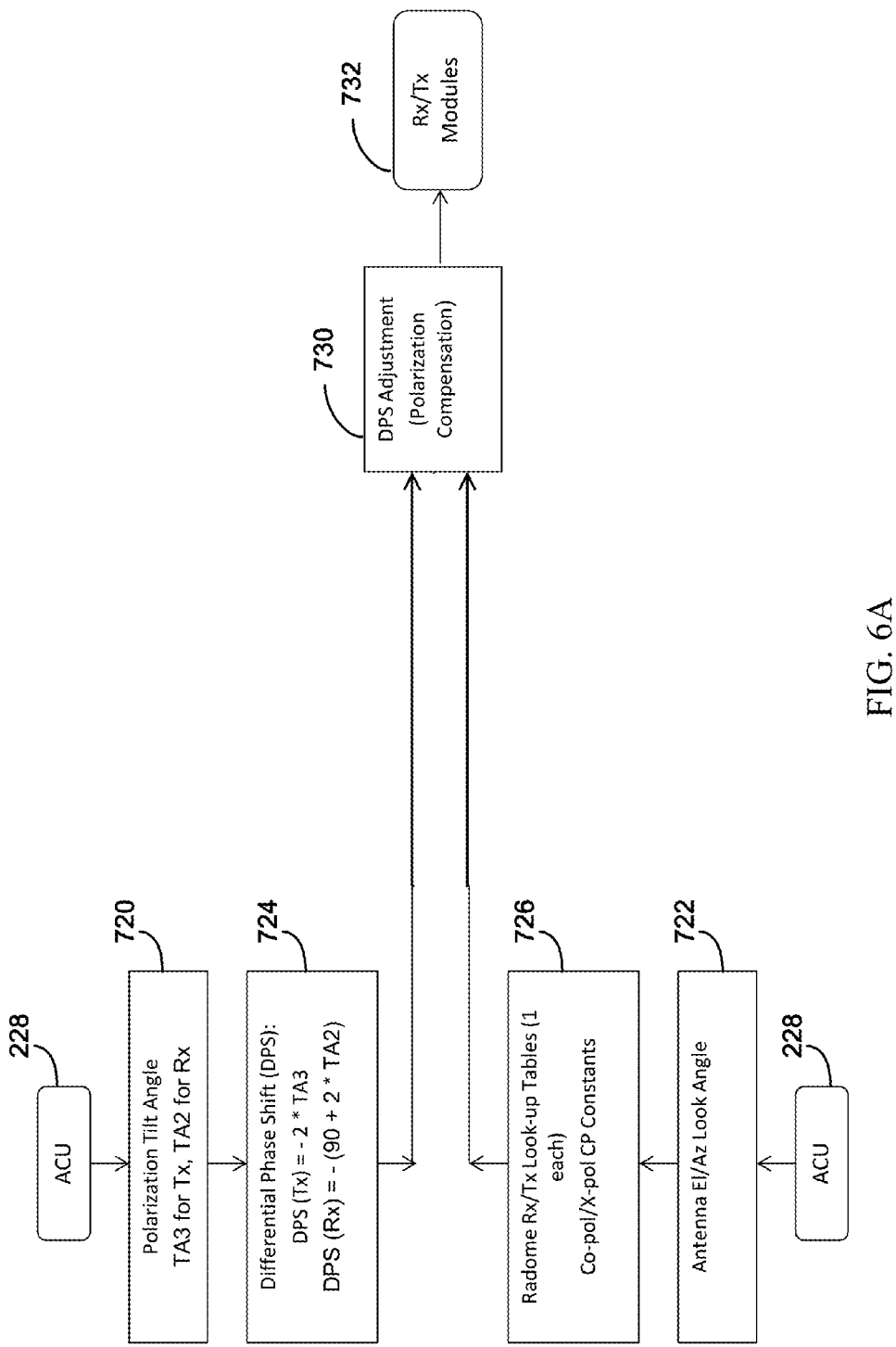
FIG. 6A is a flowchart for an example method of polarization adjustment.

Referring to FIG. 5B, a schematic block diagram of an example transmit module using the polarization control network of FIG. 5A will be described. The illustrated transmit module includes the transmit polarization control network 211 in communication with the processor 110 and the memory 112. The transmit module 206 may include the power amplifiers (e.g., solid state power amplifiers (SSPA)) AR1 (260), AR2 (262), variable phase shifters Z1 (the first transmit signal component phase shifter 264), Z2 (the second transmit signal component phase shifter 266), variable attenuators AT1 (602), AT2 (604), a power divider DC1 (268), a coupler DC3 (606), a mixer 608, and a local oscillator 610. The signal may be divided in the power divider 268, which may be an equal amplitude power divider. The processor 110 may further be configured to adjust the variable phase shifters 264, 266 and the variable power attenuators 602, 604 of the transmit polarization control network 206. As with the receive module 204, the variable attenuators 602, 604 are not utilized for polarization tracking in the sense that the attenuation introduced by them is not tilt angle dependent. These attenuators are instead provided so that LNA gain differences and/or propagation length differences resulting in different amounts of signal loss and gain for the signal paths may be compensated Referring to FIG. 6A, a flowchart for an example method of polarization adjustment is described below. In some embodiments, the process illustrated in FIG. 6A may be performed by or implemented by, for example, the processor 110. Some or all of the illustrated process may be stored in a non-transitory computer-executable form in the memory 112, for example. The example method may implement differential phase shift (DPS) adjustment or polarization compensation. The ACU 228 may determine the polarization tilt angle at 720 and the elevation and azimuthal angles at 722. From these values, phase shifts for the transmit and receive signal components are computed or retrieved at 724 and 726. These phase shifts are combined into differential phase shift adjustments at 730 for the phase shifters 254, 256, 264, and 266, and these are sent to the transmit and receive modules to configure the phase shifters 254, 256, 264, and 266 accordingly.

Figure 6B:
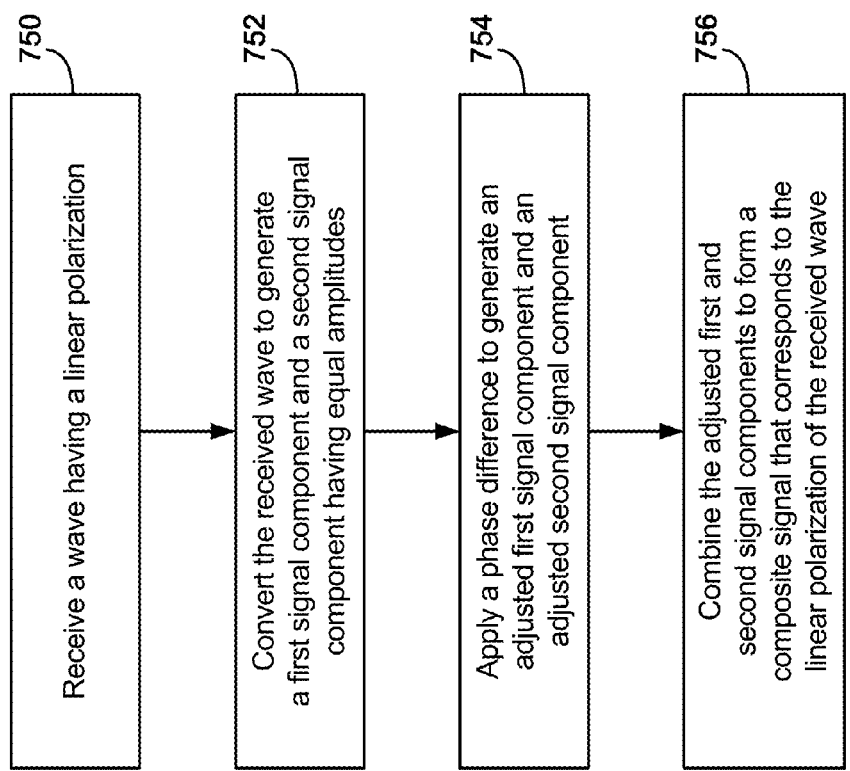
FIG. 6B is a flowchart for another example method of polarization control for a receive process.

Referring to FIG. 6B, a flowchart for another example method of polarization control for a receive process is described below. The process illustrated in FIG. 6B may be performed by or implemented by, for example, the processor 110 in some embodiments. Some or all of the illustrated process may be stored in a non-transitory computer-executable form in the memory 112, for example.

At block 750, a linearly polarized wave may be received. An array of antenna elements may receive the wave from a satellite, for example, and the received wave may have a linear polarization.

At block 752, the wave may be converted to a first signal component and a second signal component having equal amplitudes. The first signal component and the second signal component may be generated by a plurality of polarization transducers, which may be a part of the aperture 202 discussed above, for example. The first signal component and the second signal component generated from the received wave may have equal amplitudes independent of orientation of the linear polarization of the wave relative to the array. In some embodiments, the first signal component may correspond to a circularly polarized in one direction (e.g., right-hand or left-hand) and the second signal component may correspond to a circularly polarized in another direction (e.g., left-hand or right-hand).

At block 754, a phase difference between the first signal component and the second signal component may be applied. For example, adjusted first and second signal components may be generated by applying a phase difference between the first signal component and the second signal component generated at block 752. The adjusted first and second signal components may be generated by a polarization control network similar to the receive polarization control network 209 discussed above, for example. In some embodiments, the applied phase difference may be based on the locations of an antenna system implementing the described process and a satellite that may send the wave. The applied phase may further be based on polarization distortion of the radome 210, for example, to compensate for the polarization distortion. In some embodiments, the polarization control network may receive commands and change the phase difference accordingly. In some examples, the change in phase difference is due to a change in the orientation of the linear polarization of the wave. The change in the orientation of the linear polarization of the wave may be due to movement of the antenna system.

At block 756, the phase shifted first and second signal components may be combined to form a composite signal. The composite signal may correspond to the linear polarization of the received wave. The phase shifted first and second signal components may be combined by the polarization control network similar to the receive polarization control network 209 discussed above, for example.

Figure 6C:
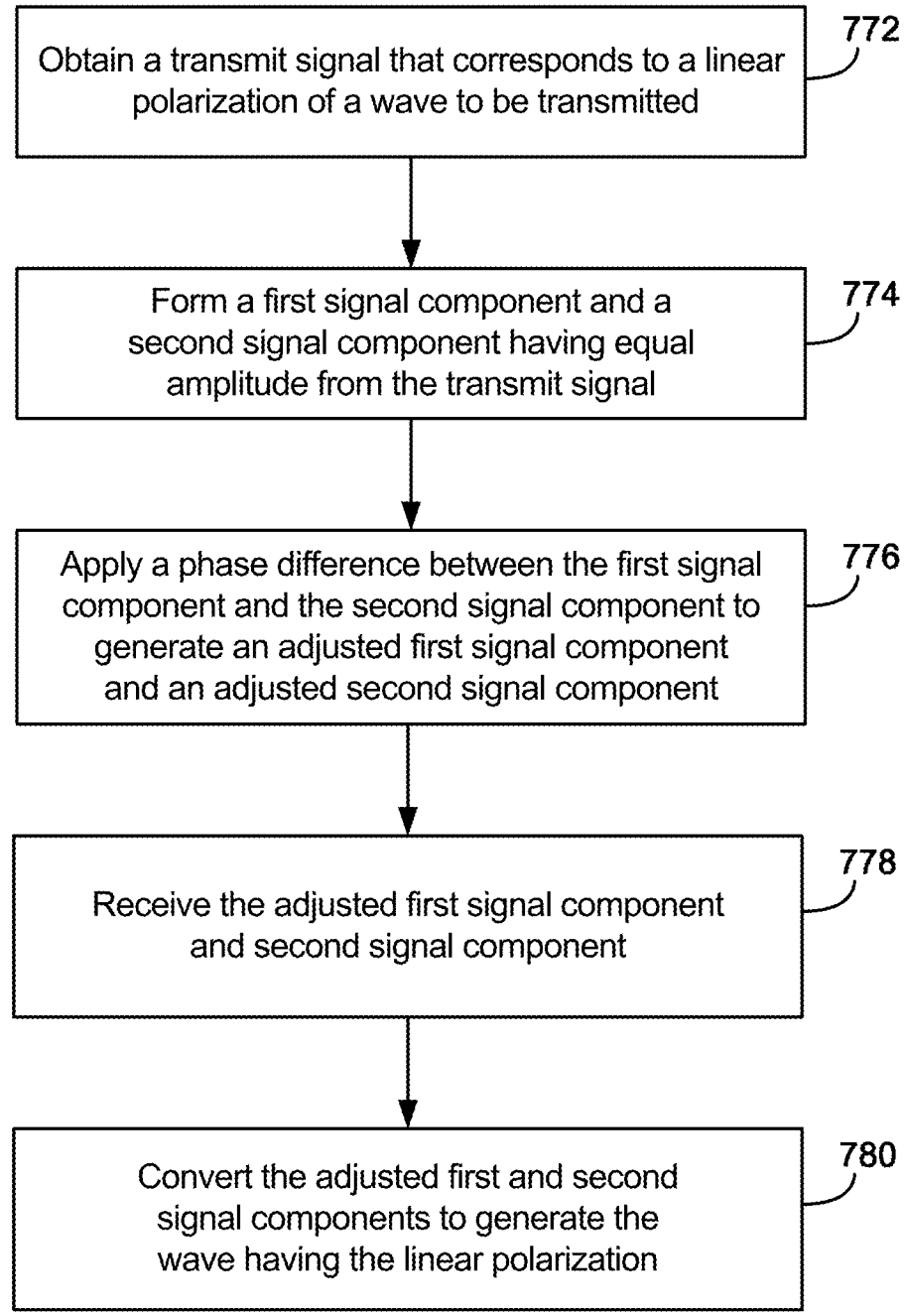
FIG. 6C is a flowchart for an example method of polarization control for a transmit process.

Referring to FIG. 6C, a flowchart for an example method of polarization control for a transmit process is described below. The process illustrated in FIG. 6C may be performed by or implemented by, for example, the processor 110 in some embodiments. Some or all of the illustrated process may be stored in a non-transitory computer-executable form in the memory 112, for example.

At block 772, a transmit signal corresponding to the linearly polarized transmit wave to be transmitted may be obtained. The transmit signal may be obtained by the transmitter polarization control network 211 discussed above, for example.

At block 774, a first signal component and a second signal component from the transmit signal may be generated. The first signal component and the second signal component may have equal amplitudes independent of orientation of the linear polarization of the wave relative to an antenna array. The first signal component and the second signal component may be generated by the transmit polarization control network 211 discussed above, for example. In some embodiments, the first signal component may correspond to a circularly polarized wave component in one direction (e.g., right-hand or left-hand) and the second signal component may correspond to a circularly polarized wave component in another direction (e.g., left-hand or right-hand). In other words, the linearly polarized wave is a composite of two circularly polarized waves of opposite senses that correspond to first and second adjusted transmit signal components.

At block 776, a phase difference between the first signal component and the second signal component may be generated. For example, adjusted first and second signal components may be generated by applying a phase difference between the first signal component and the second signal component. The phase shifted first and second signal components may be generated by the transmit polarization control network 206 discussed above, for example. In some embodiments, the applied phase difference may be based on the locations of an antenna system implementing the described process and a satellite that may receive the wave. The applied phase may further be based on polarization distortion of the radome 210, for example, to compensate for the polarization distortion.

At block 778, the adjusted first signal component and second signal component are received by an array or plurality of antenna elements that include a plurality of polarization transducers. The array having a plurality of transducers may be a part of the aperture 202 discussed above, for example.

At block 780, the adjusted first and second signal components are converted to generate wave having the linear polarization.

Figure 7:
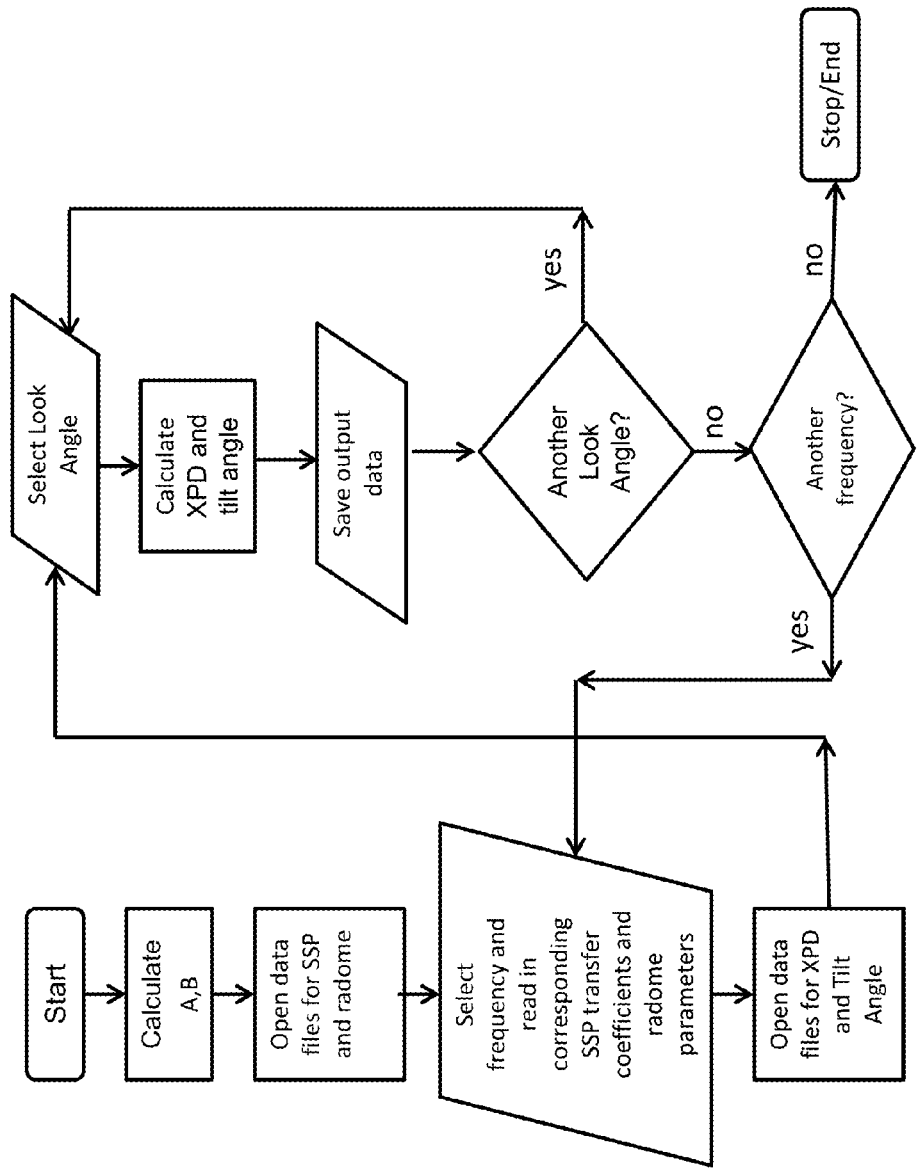
FIG. 7 is a flowchart showing code flow for modeling the polarization control systems and methods described herein.

Referring to FIG. 7, a flowchart showing code flow for modeling the polarization control systems and methods described herein is shown. Some or all of the illustrated process may be implemented in code that uses formulations to analyze cross-polarization discrimination (XPD) contributions of different subsystem components combined appropriately to determine the overall antenna system far-field XPD for all antenna look angles. In some embodiments, the process implemented herein may compensate for errors introduced in the system such as amplitude balance, phase difference balance, and errors from the combiners, diplexers, and amplifiers, resulting in, for example, cross-pol component. In some embodiments, example variable parameters may be used to implement part or all of the process described herein. The example variable parameters may include five frequency segments in the receive band, three frequency segments in the transmit band, four nominal LP field tilt angles of 0°, 45°, 90°, and 135°, channel amplitude imbalances of 0.6 dB in the receive band and 0.7 dB in the transmit band, and antenna look angles of 0°<elevation<90° and 0°<azimuth<±180° in steps of 5 degrees for both axes. In one embodiment, charts covering both receive and transmit bands may be generated, and each chart may generate XPD values as a function of look angles. In some embodiments, input data to the code may include parameters or adjustments related to radome or SSP, such as radome output data for different look angles and frequencies and SSP transfer coefficients at different frequencies.

Excluding the radome, contribution from SSP to the LP field cross-pol content may be most significant. SSP output may be expressed in the form of a polarization matrix. An excitation at Port 1 (FIG. 3A) may generate a Port 3 (FIG. 3A) output with an RHCP field expressed as right-hand elliptically polarized (RHEP) field due to cross-pol content. Similarly, an excitation at Port 2 (FIG. 3A) may generate a Port 3 (FIG. 3A) output with LHCP field expressed as left-had elliptically polarized (LHEP) field due to cross-pol content. Port 3 (FIG. 3A) polarization matrices for both Ports 1 and 2 (FIG. 3A) excitations of the SSP may be expressed as follows, wherein the Port 1 excitation is given as the RHEP Pol Matrix and the Port 2 excitation is given as the LHEP Pol Matrix:

$$RHEP\ Pol\ \text{Matrix} = \frac{1}{\sqrt{2}}\begin{bmatrix} S13H - jS13V \\ S13H + jS13V \end{bmatrix} \quad (29)$$

$$LHEP\ Pol\ \text{Matrix} = \frac{1}{\sqrt{2}}\begin{bmatrix} S23H - jS23V \\ S23H + jS23V \end{bmatrix} \quad (30)$$

in which S13H−jS13V and S23H+jS23V are cross-pol content. In the first matrix, the lower term may dominate the upper term in magnitude, and in the second matrix, the upper term may dominate the lower term in magnitude. If the SSP were to have a 0 dB axial ratio, then the cross-pol component would vanish and S13V=−jS13H and S23V=jS23H. The SSP cross-pol performance in either of the receive or transmit bands may be evaluated separately in HFSS, and this data may be combined with the Aexp(jΦ1) and Bexp(jΦ2) excitations to determine the overall cross-pol performance. The network polarization matrix may be expressed as:

$$\frac{1}{\sqrt{2}}\left(A^{j\Phi 1} RHEP\ Pol\ \text{Matrix} + B^{j\Phi 2} LHEP\ Pol\ \text{Matrix}\right) \quad (31)$$

If A=B, as it may be in a well-designed system, then an in-phase condition between the two matrices leads to a horizontal LP filed with a zero cross-pol content. This result may be the same as having oppositely-directed E1 and E2 field vectors in phase with each other. An out-of-phase condition may lead to a vertical LP filed component with a zero cross-pol content. If $180°<\Phi1-\Phi2<0°$, then the resulting tilt angle may be equal to $(\Phi1-\Phi2)/2$, which may lie in the first or third quadrant of the x-y axis coordinate system. For a tilt angle in the second or fourth quadrant, the phase condition may be $-180°<\Phi1-\Phi2<0°$.

An amplitude error may exist if A B, and a phase error may exist if $\Phi1-\Phi2 \neq \Phi_O$ (the desired phase difference). The antenna system described herein may have a predetermined tolerance level for these errors. For example, the antenna system described herein may require system cross-pol of no worse than −24.8 dB. Potential errors may be analytically determined based on models and simulations.

An antenna system including a radome may be analyzed based on known radome physical and electrical properties. For each antenna look angle $(\theta, \Phi)$ of the main beam, the radome incident angle $(\theta_i, \Phi_i)$ can be calculated, which determines the refracted radome output angle $(\theta_o, \Phi_o)$. At this output angle, the field may consist of both co-pol CP and cross-pol CP components. As discussed above, the presence of a radome may require adjustments to processing incoming and outgoing signals. Assuming radome incident CP signals are perfect, the radome output signals may be given as:

If *randome* incident field is LHCP (32)

$$\text{Then the random output polarized field matrix} = \begin{bmatrix} \overline{P} \\ \overline{Q} \end{bmatrix}, |\overline{Q}| < |\overline{P}|$$

If *randome* incident field is RHCP (33)

$$\text{Then the random output polarized field matrix} = \begin{bmatrix} \overline{M} \\ \overline{N} \end{bmatrix},$$

$$|\overline{M}| < |\overline{N}|$$

The field matrices $\overline{M}$ and $\overline{Q}$ above are cross-pol components with unequal magnitudes and phase. Equation (31) may be restated in terms of its LHCP and RHCP components, which do not include the radome effects. The LHCP component can be expressed as:

$$\overline{NL} = \frac{1}{2}[A^{j\phi1}(S13H - jS13V) + B^{j\phi2}(S23H - jS23V)] \quad (34)$$

and the RHCP component can be expressed as:

$$\overline{NL} = \frac{1}{2}[A^{j\phi1}(S13H + jS13V) + B^{j\phi2}(S23H + jS23V)] \quad (35)$$

Combining both the network polarized field and radome effects, the total polarized field can be determined. The total far field and its LHCP and RHCP components can be expressed as:

$$\overline{E_T} = (\overline{E^L}\hat{i}_L + \overline{E^R}\hat{i}_R) \quad (36)$$

where $$\overline{E^L} = (\overline{NL}*\overline{P} + \overline{NR}*\overline{M}) \text{ and } \overline{E^R} = (\overline{NL}*\overline{Q} + \overline{NR}*\overline{N}) \quad (37)$$

Based on the expressions above, if the radome did not generate any cross-pol by itself and were lossless, i.e., $\overline{M}=\overline{Q}=0$ and $\overline{P}=\overline{N}=1$, then the total field may be reduced to that of network polarized field alone, which can be expressed as below:

$$\overline{E_T} = (\overline{NL}\hat{i}_L + \overline{NR}\hat{i}_R) \quad (38)$$

The analyzed scattering matrix parameters may be inserted into Equation (31) above, and the magnitudes of A and B may be varied relative to each other to determine the network cross-pol as a function of frequency. Accordingly, the maximum cross-pol level as a function of the amplitude error may be determined. Based on the system cross-pol requirements, the maximum allowable phase error (PE) as a function of amplitude error may be determined. The allowable PE may increase as the amplitude error decreases. Furthermore, the system cross-pol and LP tilt angle as a function of frequency for given amplitude and phase errors may be determined.

Figure 8:
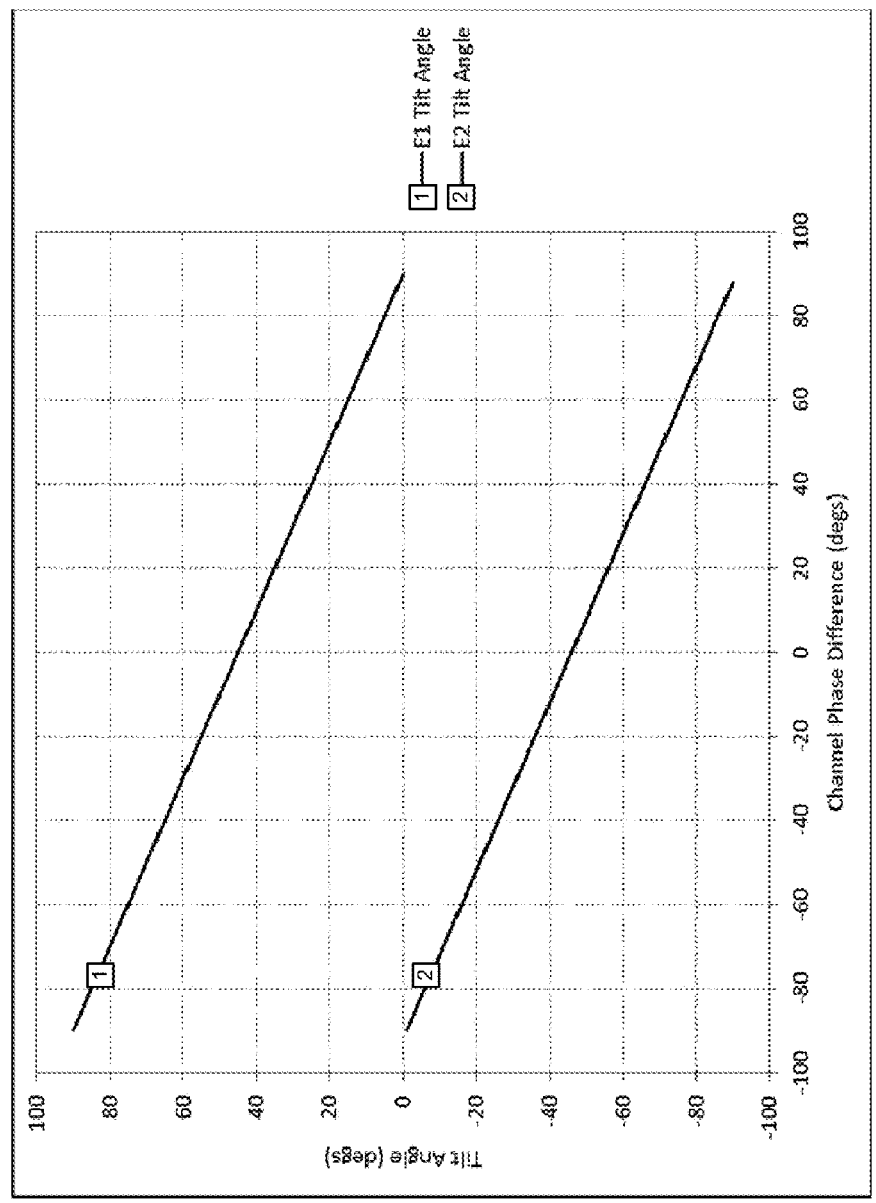
FIG. 8 is a graph illustrating tilt angle and phase difference of a polarization control network.

Referring to FIG. 8, a graph illustrating tilt angle and phase difference of a polarization control network is described below. The graph illustrates the relationship between orthogonal wave tilt angles and applied phase differences in the receive band using a 90 degree hybrid.

Figure 9:
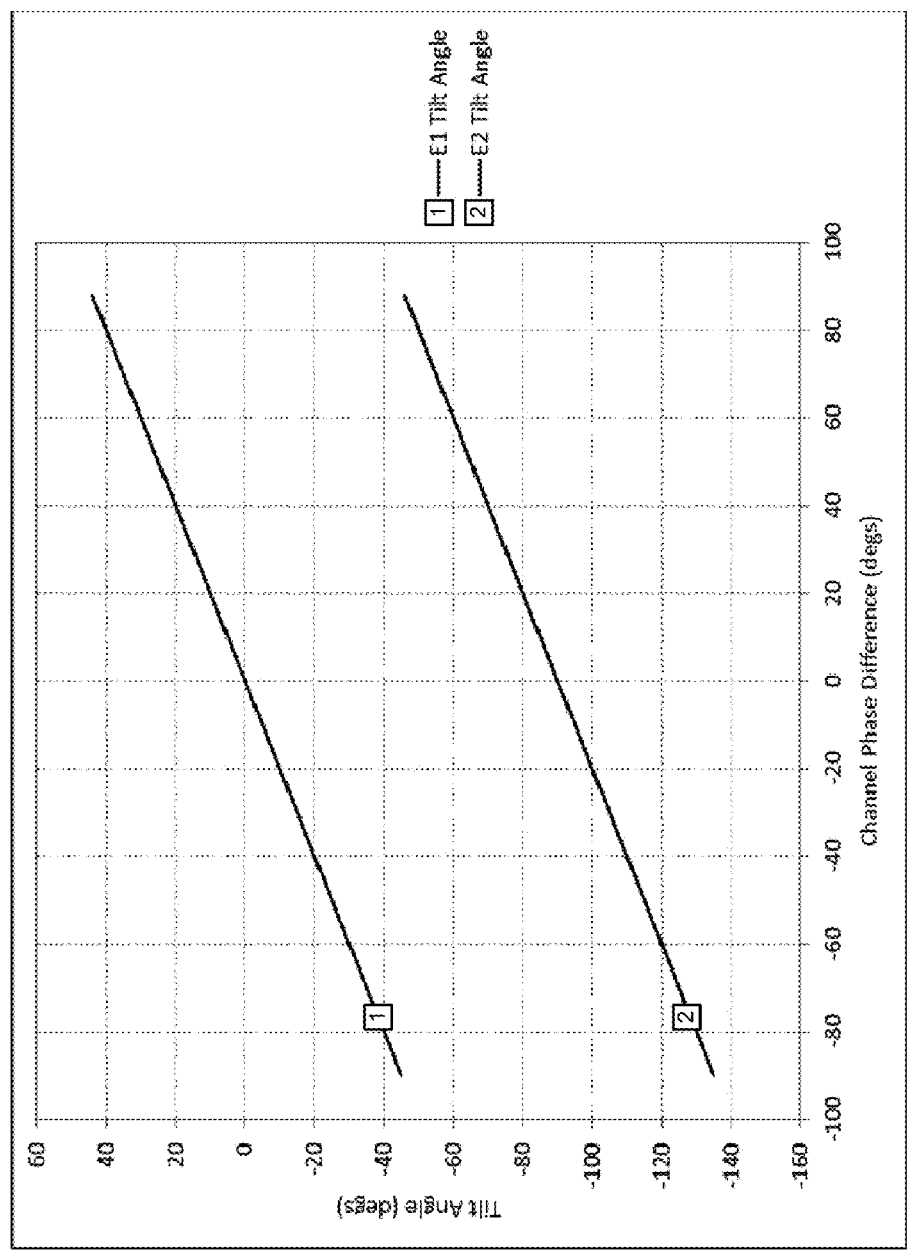
FIG. 9 is a graph illustrating tilt angle and phase difference of another polarization control network.

Referring to FIG. 9, a graph illustrating tilt angle and phase difference of another polarization control network is described below. The graph illustrates the relationship between orthogonal wave tilt angles and applied phase differences in the transmit operation or when using a 180 degree hybrid in the receive polarization control network.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this technology has been described in terms of certain embodiments, other embodiments that are apparent to those of ordinary skill in the art, including embodiments that do not provide all of the features and advantages set forth herein, are also within the scope of this technology. Moreover, the various embodiments described above can be combined to provide further embodiments. In addition, certain features shown in the context of one embodiment can be incorporated into other embodiments as well.

What is claimed is:

1. An antenna system, comprising:
    a plurality of antenna elements, each antenna element comprising a polarization transducer to receive a wave having a linear polarization, to generate a divided first signal component responsive to a first circular polarization from the received wave, and to generate a divided second signal component responsive to a second circular polarization from the received wave;
    a first waveguide power divider/combiner network that combines the divided first signal components from the plurality of antenna elements to obtain a first signal component;
    a second waveguide power divider/combiner network that combines the divided second signal components from the plurality of antenna elements to obtain a second signal component, the first and second signal components having equal amplitude independent of orientation of the linear polarization of the wave relative to the antenna system; and
    a polarization control network to:
        apply a phase difference between the first signal component and the second signal component to generate an adjusted first signal component and an adjusted second signal component, wherein the applied phase difference is based on the orientation of the linear polarization of the wave relative to the antenna system; and
        combine the adjusted first and second signal components to form a composite signal that corresponds to the linear polarization of the wave.

2. The antenna system of claim 1, wherein a given polarization transducer in the plurality of polarization transducers is a septum polarizer.

3. The antenna system of claim 1, wherein the polarization control network is responsive to commands to change the phase difference due to a change in the orientation of the linear polarization of the wave.

4. The antenna system of claim 3, wherein the change in the orientation of the linear polarization of the wave is due to movement of the antenna system.

5. The antenna system of claim 1, wherein the plurality of antenna elements receives the wave from a satellite.

6. The antenna system of claim 5, wherein the polarization control network adjusts the applied phase difference based at least in part on the locations of the antenna system and the satellite.

7. The antenna system of claim 1, further comprising a radome over the plurality of antenna elements, and wherein the phase difference applied by the polarization control network compensates for polarization distortion due to the radome.

8. The antenna system of claim 1, wherein the polarization control network includes amplitude adjustment components to compensate for amplitude differences between the first signal component and the second signal component.

9. The antenna system of claim 8, wherein the amplitude differences include signal path differences through the polarization control network for the first signal component and the second signal component.

10. The antenna system of claim 1, wherein:
    the linear polarization is a first linear polarization;
    the wave further includes a second linear polarization orthogonal to the first linear polarization; and
    the polarization control network further combines the adjusted first signal component and the adjusted second signal component to form a second composite signal that corresponds to the second linear polarization of the wave.

11. The antenna system of claim 10, wherein the polarization control network includes a hybrid circuit to:
    combine the adjusted first signal component and the adjusted second signal component with a first relative phase difference to form the composite signal that corresponds to the first linear polarization of the wave;
    combine the adjusted first signal component and the adjusted second signal component with a second relative phase difference to form the second composite signal that corresponds to the second linear polarization of the wave.

12. The antenna system of claim 1, wherein the polarization control network includes:
    a first phase shifter responsive to commands to apply a first phase shift to the first signal component, thereby generating the adjusted first signal component; and
    a second phase shifter responsive to commands to apply a second phase shift to the second signal component, thereby generating the adjusted second signal component.

13. The antenna system of claim 12, wherein the polarization control network includes:
    a first low noise amplifier to amplify the first signal component for input to the first phase shifter; and
    a second low noise amplifier to amplify the second signal component for input to the second phase shifter.

14. The antenna system of claim 12, wherein the second phase shift corresponds to an equal magnitude phase shift as the first phase shift in an opposite phase shift direction.

15. The antenna system of claim 1, further comprising a second polarization control network to:
    form a third signal component and a fourth signal component from a transmit signal that corresponds to a second linear polarization of a second wave, wherein the third signal component and the fourth signal component have equal amplitude;

apply a second phase difference between the third signal component and the fourth signal component to generate an adjusted third signal component and an adjusted fourth signal component, wherein the applied second phase difference is based on the orientation of the second linear polarization of the second wave relative to the antenna system; and provide the adjusted third signal component and the adjusted fourth signal component to the plurality of polarization transducers to transmit the second wave having the second linear polarization from the antenna system.

16. The antenna system of claim 15, wherein the linear polarization of the wave is different than the second linear polarization of the second wave.

17. The antenna system of claim 15, wherein the linear polarization of the wave is the same as the second linear polarization of the second wave.

18. The antenna system of claim 15, further comprising:
a first diplexer having a common port coupled with first divided waveguide ports of the plurality of polarization transducers that are responsive to the first circular polarization, the first diplexer having a first frequency band port to output the first signal component and a second frequency band port to input the adjusted third signal component; and
a second diplexer having a common port coupled with second divided waveguide ports of the plurality of polarization transducers that are responsive to the second circular polarization, the second diplexer having a first frequency band port to output the second signal component and a second frequency band port to input the adjusted fourth signal component.

19. The antenna system of claim 15, wherein the first wave is in a first frequency band and the second wave is in a second frequency band that is different from the first frequency band.

20. The antenna system of claim 1, wherein the polarization control network electronically applies the phase difference between the first signal component and the second signal component.

21. The antenna system of claim 1, wherein the plurality of antenna elements comprise an array of polarization transducers to form an aperture of the antenna system.

22. An antenna system comprising:
a polarization control network to:
obtain a transmit signal that corresponds to a linear polarization of a wave to be transmitted by the antenna system;
form, from the transmit signal, a first signal component that corresponds to a first circular polarization of the wave and a second signal component that corresponds to a second circular polarization of the wave, wherein the first signal component and the second signal component have equal amplitude independent of orientation of the linear polarization of the wave relative to the antenna system; and
apply a phase difference between the first signal component and the second signal component to generate an adjusted first signal component and an adjusted second signal component, wherein the applied phase difference is based on the orientation of the linear polarization of the wave relative to the antenna system;

a first waveguide power divider/combiner network to divide the adjusted first signal component into a plurality of divided first signal components, and to provide the plurality of divided first signal components to a plurality of polarization transducers;
a second waveguide power divider/combiner network to divide the adjusted second signal component into a plurality of divided second signal components, and to provide the plurality of divided second signal components to the plurality of polarization transducers; and
a plurality of antenna elements, each antenna element comprising a polarization transducer to receive one of the plurality of divided first signal components and to receive one of the plurality of divided second signal components, the plurality of polarization transducers to generate the wave having the linear polarization from the plurality of divided first signal components and the plurality of divided second signal components.

23. The antenna system of claim 22, wherein a given polarization transducer in the plurality of polarization transducers is a septum polarizer.

24. The antenna system of claim 22, wherein the polarization control network is responsive to commands to change the phase difference due to a change in the orientation of the linear polarization of the wave.

25. The antenna system of claim 24, wherein the change in the orientation of the linear polarization of the wave is due to movement of the antenna system.

26. The antenna system of claim 22, wherein the plurality of antenna elements transmits the wave to a satellite.

27. The antenna system of claim 26, wherein the polarization control network adjusts the applied phase difference based at least in part on the locations of the antenna system and the satellite.

28. The antenna system of claim 22, further comprising a radome over the plurality of antenna elements, and wherein the phase difference applied by the polarization control network compensates for polarization distortion due to the radome.

29. The antenna system of claim 22, wherein the polarization control network includes amplitude adjustment components to compensate for amplitude differences between the first signal component and the second signal component.

30. The antenna system of claim 29, wherein the amplitude differences include signal path differences through the polarization control network for the first signal component and the second signal component.

31. The antenna system of claim 22, wherein the polarization control network includes:
a hybrid circuit to divide the transmit signal into a first intermediate signal and a second intermediate signal;
a first phase shifter responsive to commands to apply a first phase shift to the first intermediate signal, thereby forming the adjusted first signal component; and
a second phase shifter responsive to commands to apply a second phase shift to the second intermediate signal, thereby forming the adjusted second signal component.

32. The antenna system of claim 31, further comprising:
a first amplifier to amplify the adjusted first signal component; and
a second amplifier to amplify the adjusted second signal component.

33. The antenna system of claim 31, wherein the first phase shift and the second phase shift have equal amplitudes and opposite phases.

34. The antenna system of claim 22, wherein a given polarization transducer of a given antenna element of the plurality of antenna elements combines one of the plurality of divided first signal components and one of the plurality of divided second signal components to generate a portion of the wave having the linear polarization.

35. The antenna system of claim 22, wherein the polarization control network electronically applies the phase difference between the first signal component and the second signal component.

36. The antenna system of claim 22, wherein the plurality of antenna elements comprise an array of polarization transducers to form an aperture of the antenna system.

* * * * *